United States Patent
Charles et al.

(10) Patent No.: US 9,955,443 B2
(45) Date of Patent: Apr. 24, 2018

(54) TIMING SYNCHRONIZATION FOR WIRELESS NETWORKS

(71) Applicant: DUST NETWORKS, INC., Hayward, CA (US)

(72) Inventors: Gordon Alexander Charles, Sunnyvale, CA (US); Lance Robert Doherty, Berkeley, CA (US); Thor Nelson Juneau, Menlo Park, CA (US); Mark Alan Lemkin, Berkeley, CA (US); Jonathan Simon, Castro Valley, CA (US); Zhenqiang Ye, Mountain House, CA (US)

(73) Assignee: Linear Technology Corporation, Milpitas, CA (US)

( * ) Notice: Subject to any disclaimer, the term of this patent is extended or adjusted under 35 U.S.C. 154(b) by 554 days.

(21) Appl. No.: 14/586,692

(22) Filed: Dec. 30, 2014

(65) Prior Publication Data

US 2015/0189611 A1   Jul. 2, 2015

Related U.S. Application Data

(63) Continuation of application No. 12/778,624, filed on May 12, 2010, now Pat. No. 8,953,581.

(60) Provisional application No. 61/216,202, filed on May 13, 2009.

(51) Int. Cl.
*H04W 56/00* (2009.01)
*H04L 7/04* (2006.01)
*H04J 3/06* (2006.01)

(52) U.S. Cl.
CPC ......... *H04W 56/001* (2013.01); *H04J 3/0652* (2013.01); *H04J 3/0658* (2013.01); *H04L 7/048* (2013.01); *H04W 56/003* (2013.01); *H04L 7/04* (2013.01)

(58) Field of Classification Search
CPC . H04W 56/001; H04W 56/003; H04J 3/0652; H04J 3/0658; H04L 7/048
See application file for complete search history.

(56) References Cited

U.S. PATENT DOCUMENTS

| 4,882,739 A | 11/1989 | Potash et al. |
| 5,959,982 A | 9/1999 | Federkins et al. |
| 6,362,762 B1 | 3/2002 | Jensen et al. |
| 6,690,655 B1 | 2/2004 | Miner et al. |
| 6,891,841 B2 | 5/2005 | Leatherbury et al. |

(Continued)

OTHER PUBLICATIONS

United States Office Action issued in U.S. Appl. No. 12/778,617 dated Jun. 15, 2012.

(Continued)

*Primary Examiner* — Un C Cho
*Assistant Examiner* — Jeremy Costin
(74) *Attorney, Agent, or Firm* — McDermott Will & Emery LLP

(57) ABSTRACT

A system for synchronizing nodes in a wireless network comprises a first node and a second node. The first node comprising a transmitter, a receiver, and a first time keeper. The second node comprising a transmitter, a receiver, a second time keeper, a timing error measurer for making a timing error measurement between the first time keeper and the second time keeper. The second timekeeper is adjusted to target minimizing the timing error measurement.

21 Claims, 20 Drawing Sheets

(56) References Cited

U.S. PATENT DOCUMENTS

| | | | |
|---|---|---|---|
| 8,194,636 B1* | 6/2012 | Doherty | H04J 3/0652 370/350 |
| 2004/0005902 A1 | 1/2004 | Belcea | |
| 2005/0069025 A1 | 3/2005 | Kimura | |
| 2005/0143004 A1 | 6/2005 | Dibiaso et al. | |
| 2005/0188098 A1* | 8/2005 | Dunk | H04L 67/14 709/232 |
| 2006/0115036 A1* | 6/2006 | Adachi | H03L 7/1976 375/376 |
| 2006/0187866 A1* | 8/2006 | Werb | G01D 4/004 370/311 |
| 2008/0019309 A1 | 1/2008 | Kwun et al. | |
| 2008/0089363 A1* | 4/2008 | Paulitsch | H04J 3/0685 370/503 |
| 2008/0186893 A1 | 8/2008 | Kolding et al. | |
| 2008/0253492 A1 | 10/2008 | Wang et al. | |
| 2010/0008272 A1 | 1/2010 | Messinger et al. | |
| 2011/0143781 A1 | 6/2011 | Gehlen et al. | |
| 2012/0027146 A1* | 2/2012 | Hodge | H04J 3/0664 375/356 |

OTHER PUBLICATIONS

United States Office Action issued in U.S. Appl. No. 12/778,617 dated Jan. 16, 2013.
Final Office Action issued in U.S. Appl. No. 12/778,617 dated Jul. 5, 2013.

* cited by examiner

US 9,955,443 B2

TIMING SYNCHRONIZATION FOR WIRELESS NETWORKS

CROSS REFERENCE TO RELATED APPLICATIONS

This application is a continuation of U.S. application Ser. No. 12/778,624, filed on May 12, 2010, which claims priority to U.S. Provisional Patent Application No. 61/216,202, entitled TIMING SYNCHRONIZATION FOR WIRELESS NETWORKS and filed May 13, 2009, which are incorporated herein by reference for all purposes.

BACKGROUND OF THE INVENTION

Typically in a network of devices which need to have low power consumption, communicating devices sleep for long periods and rely on clocks to wake up and communicate with each other during a defined timeslot. One solution is to use a sufficiently precise clock at each transmitter and each receiver so that the transmitters and receivers timeslots remain aligned. One problem with this solution is that precise clocks are expensive and also tend to use more power than less precise clocks. Another solution is to specify long enough timeslots so that imprecise clocks can drift relative to each other and still have sufficient time and overlap in the sending and receiving slots to effectively communicate. One problem with this other solution is that wider timeslots do not use communication bandwidth in the network very efficiently and receivers use more power with longer timeslots because they need to listen longer in the timeslots for a transmission.

BRIEF DESCRIPTION OF THE DRAWINGS

Various embodiments of the invention are disclosed in the following detailed description and the accompanying drawings.

DETAILED DESCRIPTION

Figure 1A:
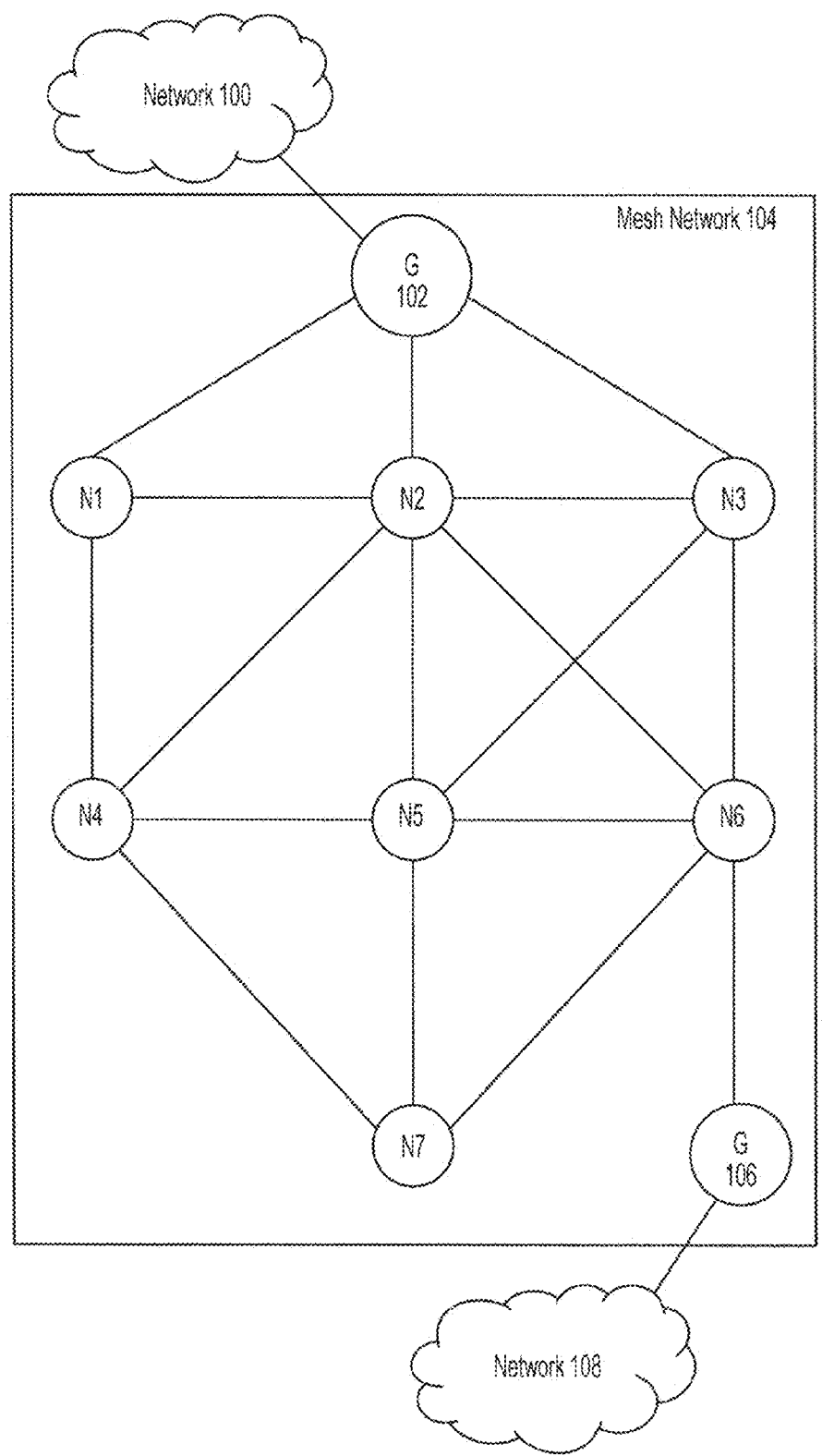
FIG. 1A is a block diagram illustrating an embodiment of a mesh network.

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Timing synchronization is disclosed. A system for synchronizing nodes in a wireless network comprises a first node and a second node. The first node comprising a transmitter, a receiver, and a first time keeper. The second node comprising a transmitter, a receiver, a second time keeper, a timing error measurer for making a timing error measurement between the first time keeper and the second time keeper. The second timekeeper is adjusted to target minimizing the timing error measurement.

In some embodiments, timing information is received in a packet received by the local node. In some embodiments, the packet is compliant with IEEE standard 802.15.4 and comprises a preamble, a start-of-frame delimiter (SFD), a packet-length field, an optional data field, and a checksum field. In some embodiments, the packet is compliant with IEEE standard 802.11. The received timing information is used to determine a second clock offset. The second offset is used to adjust the local clock.

In some embodiments, in the event that timing information received indicates that the local clock and the nodes or access points that send packets to the local node are synchronized (i.e., that the clocks of the local node and the nodes or access points that send packet to the local node are not drifting with respect to each other), a guardband time can be reduced so that a receiver is turned on for less time prior to an expected packet arrival or a keep alive interval is increased where a keep alive packet is indicated to be required less frequently. In some embodiments, a keep-alive packet is a packet periodically sent to maintain synchronization between parent and child in addition to data passed along the network. In some embodiments, before a guardband time or a keep alive interval are changed, the nodes are observed to be synchronized for a predetermined period of time. In some embodiments, the parent comprises a master timekeeper while the child comprises a slave timekeeper.

FIG. 1A is a block diagram illustrating an embodiment of a mesh network. In the example shown, mesh network 104 can communicate with network 100. In various embodiments, network 100 is a communication network and comprises a local area network, a wide area network, the Internet, a wired network, a wireless network, or any other appropriate communication network. Mesh network 104 includes access point nodes and mesh network nodes. Access point nodes are represented in FIG. 1A as G 102 and G 106. The access point node is able to communicate directly with a network—network 100 and network 108, respectively—and with mesh network nodes. For example, G 102 is able to directly communicate with N1, N2, and N3; G 106 is able to directly communicate with N6. In various embodiments, network 108 is a communication network and comprises a local area network, a wide area network, the Internet, a wired network, a wireless network, or any other appropriate communication network. In some embodiments, the access point node also acts as a mesh network coordinator sending to and receiving from the mesh network nodes information, configuration, status updates, etc. In some embodiments, there are multiple access point nodes that can communicate with the same network (e.g., network 100) or one or more different networks. Mesh network nodes are represented in FIG. 1A as N1, N2, N3, N4, N5, N6, and N7. In some embodiments, mesh network nodes are sensor or device mesh network nodes. A mesh network node can communicate with other mesh network nodes and access point nodes. For example, mesh network node N6 is able to communicate directly with mesh network nodes N5, N2, N3, and N7 and with access point node G 106. In various embodiments, the connections allow communication only in one direction (i.e., to a node or from a node) or in both directions (i.e., both to and from a node).

In the example shown in FIG. 1A, access point and mesh network nodes communicate via radio transmitters and receivers using a packet. A packet may include a header section and a data section. The packet header may include information regarding packet type, time sent, source node, destination node, node health, number of tries for a hop, number of hops, etc. The packets are sent during defined timeslots on defined frequencies using a time division multiple access (TDMA) methodology.

In some embodiments, mesh network devices synchronize to a single parent device (e.g., an access point).

Figure 1B:
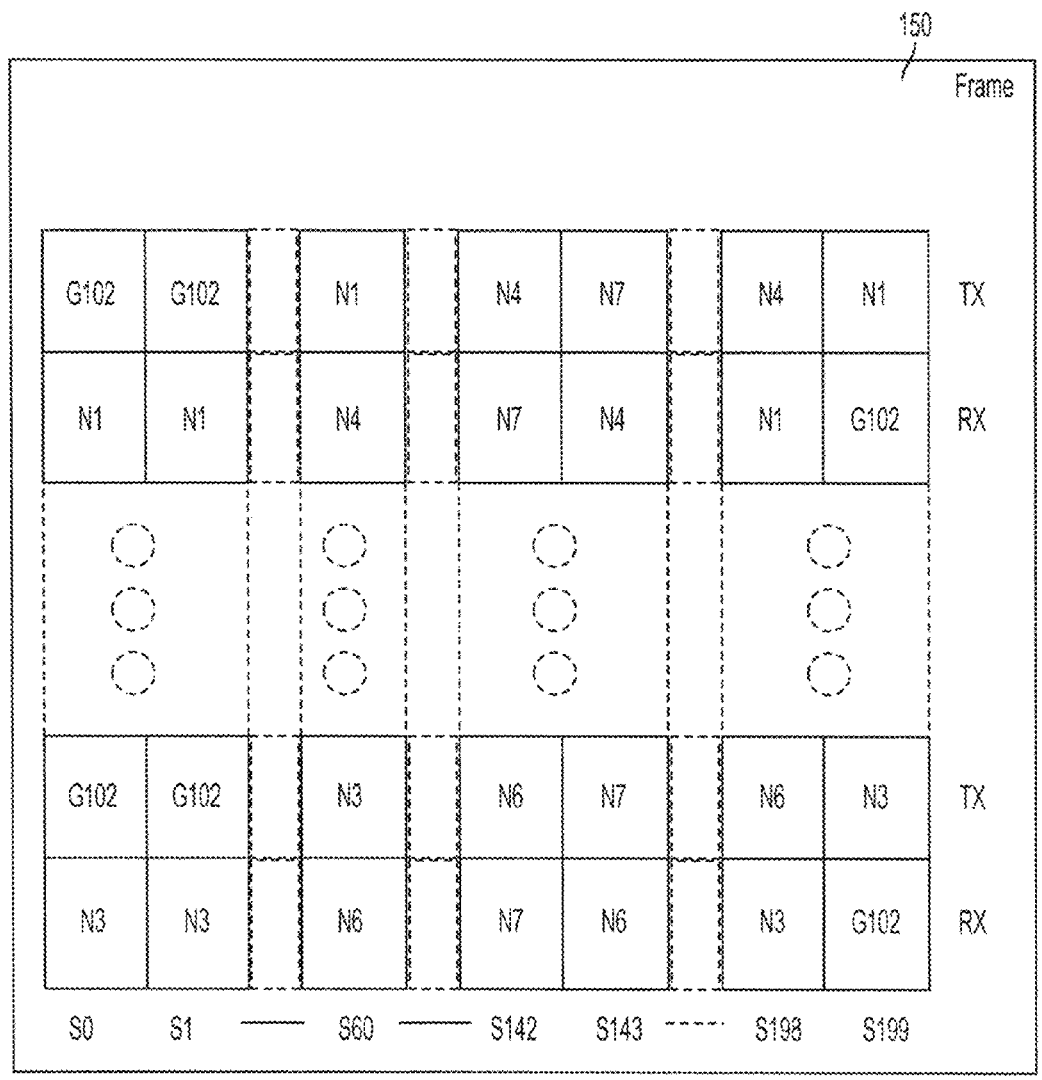
FIG. 1B is a block diagram illustrating an embodiment of a superframe.

FIG. 1B is a block diagram illustrating an embodiment of a superframe. In the example shown, superframe 150 includes timeslots that can be used to designate a receiver and a transmitter. During the timeslot a designated transmitter node transmits to a designated receiver node of a mesh network. In various embodiments, the frequency used for transmission and reception is fixed, is selected from a pool of frequencies, rotates in a fixed manner, is randomly assigned, or is assigned using any other appropriate manner of assigning frequency to a transmission and reception. In some embodiments, the frequency comprises a frequency in the ISM band from 902 MHz to 928 MHz. In some embodiments, the frequency comprises a frequency in the 2.45 GHz ISM band. Superframe 150 is repeated after executing the transmissions/receptions for all of its timeslots. The network can support several different superframes either running at different times or running concurrently. Some superframes have only a few slots and some have many slots depending on their design. Superframe 150 contains 200 timeslots (represented by S0, S1, S60, S142, S143, S198, and S199). Transmission links in the mesh network are assigned cells in a superframe during which they can communicate. The transmissions and receptions for the superframe are represented by designating a transmitter and a receiver for a given timeslot. In S0 and S1, access point G102 sends to node N1 and separately to N3. In S60, node N1 sends to node N4, and node N3 sends to node N6. In S142, node N4 sends to node N7, and node N6 sends to node N7. In S143, node N7 sends to node N4, and node N7 sends to N4. In S198, node N4 sends to node N1, and node N6 sends to node N3. In S199, node N1 sends to access point G102, and node N3 sends to access point G102. Nodes in the mesh network are activated along a given branch of the network—only activating portions of the superframe—so that a given node only sends to or receives from one other node in the mesh network. Other slots can contain transmissions and receptions between other network nodes or can be left empty.

In various embodiments, individual timeslots in a superframe can have one transmitter, or a plurality of transmitters. In various embodiments, individual timeslots in a superframe have one receiver or a plurality of receivers. An example of one transmitter and multiple receivers is a broadcast timeslot where several nodes receive the same packet from the transmitter at the same time. An example of one receiver and multiple transmitters is a join listen timeslot where multiple joining nodes can potentially transmit during the same timeslot to a listening node; a backoff algorithm is required for congestion control in these scenarios.

Figure 2:
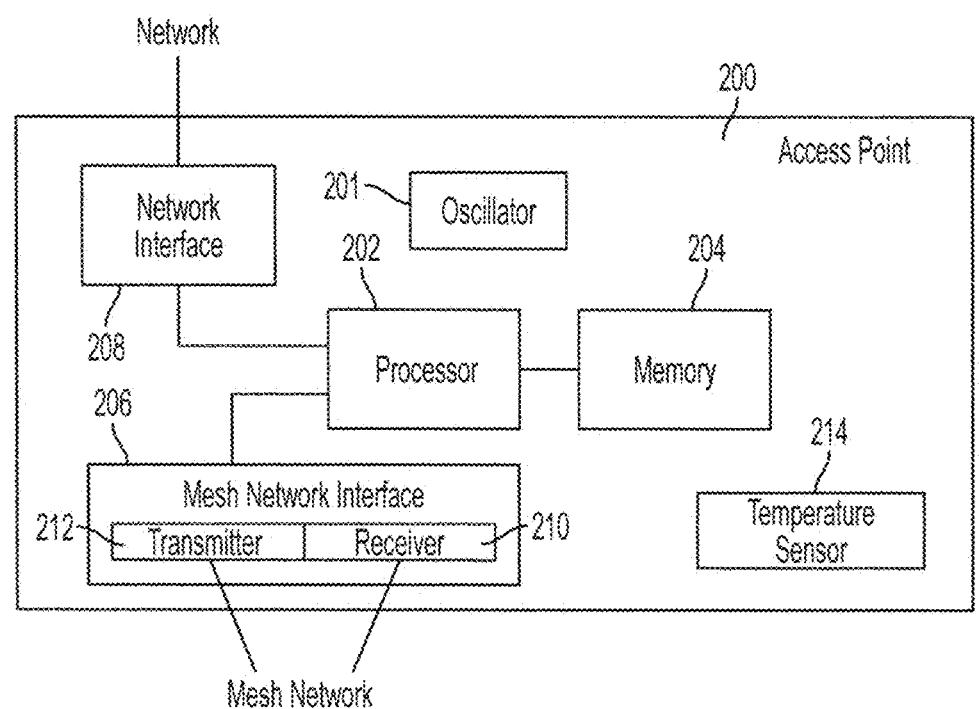
FIG. 2 is a block diagram illustrating an embodiment of an access point of a mesh network.

FIG. 2 is a block diagram illustrating an embodiment of an access point of a mesh network. In some embodiments, the access point 200 of FIG. 2 is used to implement G 102 and/or G 106 in FIG. 1A. In the example shown, access point 200 includes oscillator 201, processor 202, memory 204, mesh network interface 206, and network interface 208. In some embodiments, the processor doesn't connect to a network interface, but rather communicates to an external device using, for example, a UART or SPI interface. Processor 202 runs software that when executed manages the mesh network. Management of the mesh network includes network setup, adding nodes, removing nodes, adding superframes to the network, removing superframes, monitoring status, optimizing network performance by reconfiguring superframes, time synchronization, and/or any other appropriate network management function. Memory 204 provides storage for processor 202 including run-time storage and instruction storage. Mesh network interface 206 includes receiver 210 and transmitter 212. Receiver 210 receives communications in the form of packets transmitted from the mesh network. Transmitter 212 transmits communications in the form of packets to the mesh network. Network interface 208 communicates with a communication network comprising of one or more devices. Information from the mesh network is passed directly to or processed by access point 200 using processor 202 before passing to the communication network. In some embodiments, access point 200 is line powered so that power limitations due to finite battery reserves are not an issue. In various embodiments, network management is accomplished by a remote application or is coordinated by a node in the network.

Oscillator 201 provides information that is used to determine a local clock. In various embodiments, oscillator 201 is calibrated based at least in part on: an external time standard (e.g., satellite broadcast time, internet broadcast time, or any other appropriate time reference), a local stored calibration curve, a corrected generic calibration curve (e.g., a standard curve that has been adjusted by curve-fitting to one or more calibration measurements), a complete temperature compensation process so that they can be a fully-calibrated 'timing master,' or any other appropriate calibration. Temperature sensor 214 is used to measure a temperature. In some embodiments, the measured temperature is used to determine the appropriate calibration for the access point 200 clock in conjunction with the temperature calibration curve.

Figure 3:
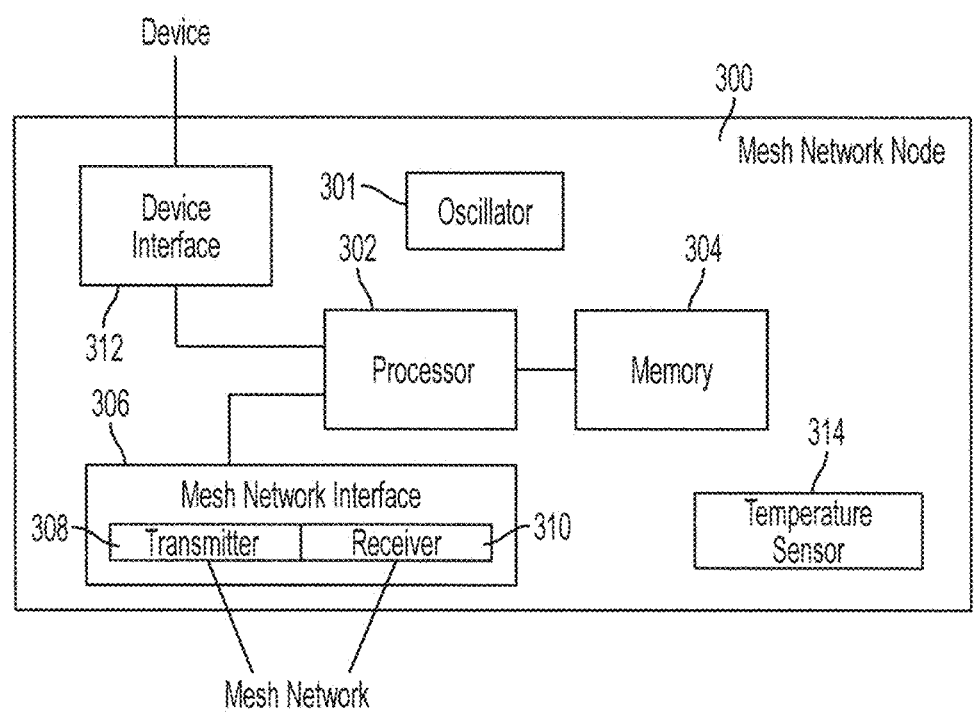
FIG. 3 is a block diagram illustrating an embodiment of a mesh network node of a mesh network.

FIG. 3 is a block diagram illustrating an embodiment of a mesh network node of a mesh network. In some embodiments, mesh network node 300 of FIG. 3 is used to implement nodes N1, N2, N3, N4, N5, N6, and/or N7 in FIG. 1. In the example shown, mesh network node 300 includes oscillator 301, processor 302, memory 304, mesh network interface 306, device interface 312, and temperature sensor 314. Processor 302 runs software that when executed operates mesh network node 300. Operation of mesh network node 300 includes setup, receiving messages, transmitting messages, adding capacity, removing capacity, providing status reports to an access point manager such as access point 200 in FIG. 2, time synchronization, and/or any other appropriate operating function. Memory 304 provides storage for processor 302 including run-time storage and instruction storage. Mesh network interface 306 includes receiver 310 and transmitter 308. Receiver 310 receives communications in the form of packets transmitted from the mesh network. Transmitter 308 transmits communications in the form of packets to the mesh network. In some embodiments, mesh network node 300 is usually battery powered so that power limitations due to finite battery reserves are an issue. Device interface 312 communicates with a device and/or sensor. In various embodiments, device and/or sensor types that are connected to mesh network node 300 include temperature sensors, strain sensors, image sensors, vibration sensors, fluid level sensors, chemical sensors, gas sensors, radiation detectors, position sensors, acceleration sensors, inclination sensors, shock sensors, infrared sensors, sound sensors, current sensors, voltage sensors, switching device, actuator device, or any other appropriate device and/or sensor. Information to/from the sensor and/or device is passed directly to or processed by sensor mesh network node 300 using processor 302 before passing from/to the mesh network.

Oscillator 301 provides information that is used to determine a local clock. In various embodiments, oscillator 301 is calibrated based at least in part on: an external time standard (e.g., an access point time, one or more other node time(s), satellite broadcast time, internet broadcast time, or any other appropriate time reference), a local stored calibration curve, a corrected generic calibration curve (e.g., a standard curve that has been adjusted by curve-fitting to one or more calibration measurements), or any other appropriate calibration. In some embodiments, the curve fitting used to adjust the standard curve comprises a least-squares fitting. Temperature sensor 314 is used to measure a temperature. In some embodiments, the measured temperature is used to determine the appropriate calibration for mesh network node 300 clock in conjunction with the temperature calibration curve.

To maintain low power consumption, as well as low cost, oscillator 301 often includes a watch crystal, or 32 kHz crystal, (with a nominal 32.768 kHz operating frequency) and an oscillation circuit to make, for example, the well-known Pierce oscillator. The power dissipated by a 32 kHz oscillator may be designed to be a fraction of a micro-Watt. However, watch crystals typically have very poor frequency vs. temperature characteristics, often changing more than 100 ppm from the nominal frequency over the industrial temperature range of −40 C to 85 C. An oscillator used for the radio provides a stable frequency reference for radio frequency (RF) carrier generation; actual RF carrier generation is generally accomplished using a voltage controlled oscillator (VCO) and a phase-locked loop (PLL). The radio oscillator typically operates at a higher frequency than a node oscillator. Due to the physical construction of higher-frequency quartz crystal resonators, radio oscillators typically have a frequency vs. temperature characteristic that is less than the node oscillator, for example +/−25 ppm over temperature. In addition, the part-to-part variation of the radio oscillator change in frequency versus temperature characteristic is often less than the part-to-part variation of the node oscillator change in frequency versus temperature characteristic.

A radio oscillator can be used to calibrate a node oscillator at run time with high accuracy due to the more temperature-stable characteristics of the radio oscillator. In some embodiments, the node oscillator calibration is accomplished with a counter that is started and then stopped after a number of node oscillator cycles; the counter counts the number of radio oscillator cycles that elapsed while the counter was enabled. In some embodiments, the radio oscillator is calibrated at time of manufacture or test. In some embodiments, the determination of a particular radio oscillator's frequency (e.g., 20 MHz plus a frequency error in ppm) is accomplished very quickly using automated test equipment, thereby keeping calibration costs very low. Given the temperature-stable characteristics of the radio oscillator, a measurement of the radio oscillator's frequency at a single temperature, for example room temperature, can be used for a single point calibration. Using the single-point calibration measurement, a temperature measurement, and a fit of the temperature dependence of a typical radio oscillator, a radio oscillator can be corrected to within an error associated with the variation of the radio oscillator from a typical radio oscillator. In some embodiments, a temperature measurement is made, for example, using a proportional-to-absolute-temperature circuit (PTAT), a thermistor, a thermocouple, a $V_{be}$ circuit, or any other way of measuring temperature.

In some embodiments, timing adjustment to correct errors of the node oscillator is accomplished through a modulated timekeeping loop using a sigma-delta or a delta-sigma modulator. Herein the terms delta-sigma modulator and sigma-delta modulator are used interchangeably to describe a feedback system comprising an accumulator, a comparator, and a feedback path to a summing junction where the feedback is subtracted from an input set-point or control signal. In some embodiments, the feedback signal is added at the summing junction to provide a functional modulator, depending on the sign and/or polarity of components in the forward path. The input to the modulator provides a set-point to compensate errors in the 32 kHz oscillator frequency in response to a known or estimated error. For example, if the ambient temperature was −40 C, crystal frequency versus temperature calibration or characterization may indicate that the oscillator would have a −150 ppm frequency error, meaning that the oscillator would be running 150 ppm slow. The input to the modulator would be set to approximately +150 ppm to compensate for this error (ignoring second order terms). In addition to correcting for temperature variation of crystal frequency, the delta-sigma timing modulator allows easy compensation of frequency errors as determined by a parent-tracking system as disclosed herein. The input set-point to the modulator may be in units of ppm, a scaled version of ppm having arbitrary units, or any other appropriate input signal.

A delta-sigma timing modulator has numerous advantages over existing timing compensation techniques such as periodic addition and subtraction (or, equivalently, pulse skipping) of clock ticks from a counter. One advantage includes a rapid compensation response to input commands for a change in ppm; for example, in one embodiment the compensation response (how long it takes the modulator to change the compensation to a step change in input) can be 1 ms or even faster. A second advantage is that the compensation input to the modulator may be in units of ppm or scaled ppm, versus reciprocal ppm. Having an input in units of ppm or scaled ppm is advantageous because the frequency error vs. temperature characteristics of a crystal oscillator is more naturally described by a ppm vs. temperature curve; timing errors in a parent tracking system may be more naturally described in either units of ppm or time-error, time-error being effectively an un-normalized representation of frequency error; desired set-point values from crystal temperature and parent-tracking may be easily added or subtracted (as appropriate) to attain a net desired compensation value. A third advantage of a delta-sigma timing modulator is that compensation is linear and the compensation resolution is constant over the entire range of the modulator. A fourth advantage of a delta-sigma timing modulator is that the modulator is easily implemented in a low-power system that spends a majority of its time in a "sleep" state counting compensated clock ticks and waiting for a certain time to wake up. A fifth advantage is that sub-32 kHz clock-tick resolution may be achieved using a delta-sigma modulator in conjunction with a higher-speed clock as disclosed herein.

Figure 4A:
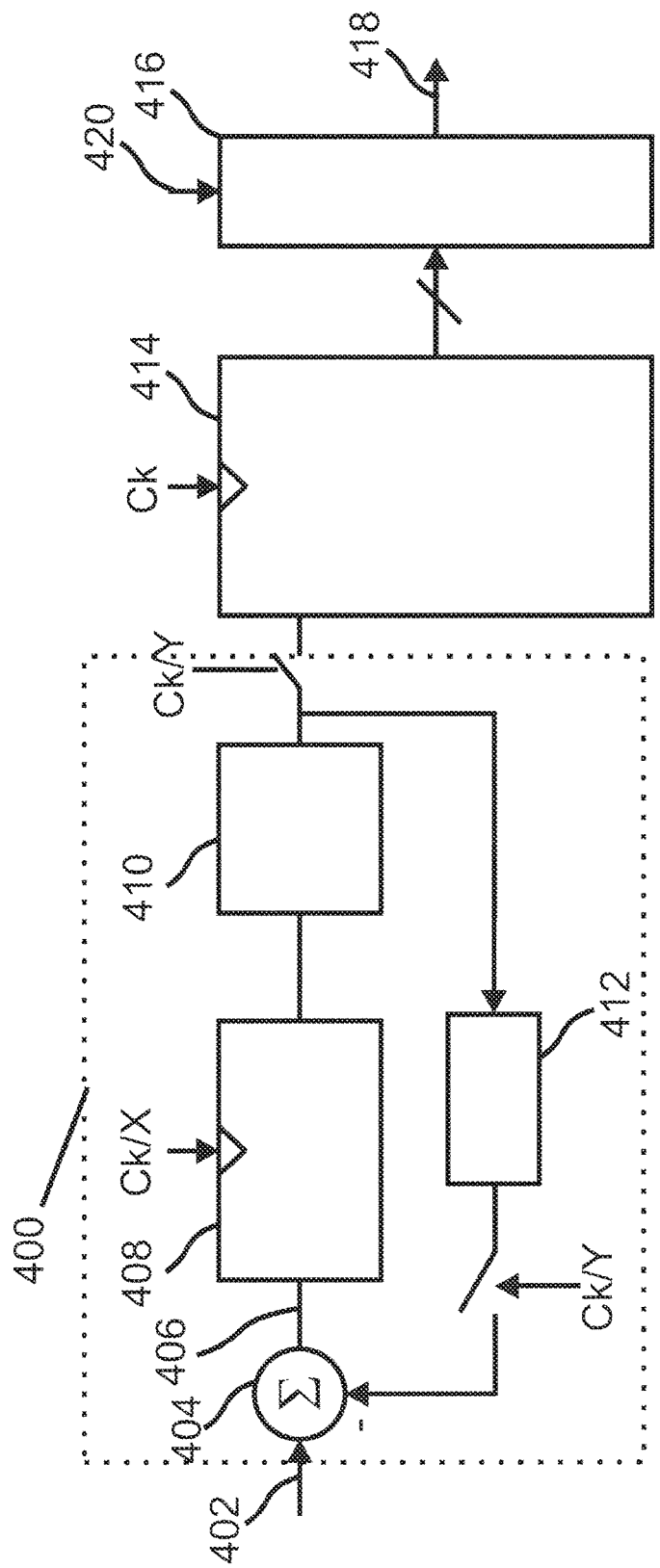
FIG. 4A is block diagram illustrating an embodiment of a timing compensator with a delta-sigma modulator.

FIG. 4A is a block diagram illustrating an embodiment of a delta-sigma timing compensator with delta sigma modulator. In the example shown, for ease of explanation, and so as not to unnecessarily distract from the teaching, input 402 in this diagram is the desired compensation ppm (parts-per-million frequency correction) in integer format. In various embodiments, the input to delta-sigma timing modulator 400 is integer format with a least-significant-bit (lsb) corresponding to a fractional ppm (such as ¼ ppm, ⅛ ppm); the input to delta-sigma modulator 400 is a floating point value; the input to delta sigma modulator 400 is an integer or floating point value representative of frequency error other than a frequency error in ppm; or any other appropriate input. In some embodiments, there are two ppm inputs at summing junction 404: a first input for typical crystal characteristic compensation, and another input from a parent tracking system output. The input to delta sigma modulator 400 is the desired frequency compensation value, X ppm. Main timer 414 counts clock ticks at a rate Ck. Timer comparator 416 compares the present value of main timer 414 with a desired event time 420 and signals an event occurrence at output 418. In various embodiments, a main timer 414 or a main timer in conjunction with an adjustment (e.g., an adjustment stored in an accumulator) comprise a time keeper for a node, or any other appropriate timer comprises a time keeper. Delta sigma modulator 400 either adds or subtracts a tick from main timer 414 every Y clock ticks. In some embodiments, ticks are effectively subtracted from main timer 414 by not incrementing main timer 414 at the next occurrence of a Ck edge. Now, defining $Z=((1/Y)*1e6)$, adding or subtracting a tick every Y clock ticks is equivalent to compensating approximately +Z or −Z ppm. Z may be rounded for simplicity; errors due to rounding show up as a small scale-factor error, generally having negligible impact. Every Y cycles, the desired ppm value is subtracted from the present compensation ppm value (+/−Z), yielding error 406. This error is fed into accumulator 408 which keeps track of accumulated error. The output of accumulator 408 goes into quantizer 410. In various embodiments, quantizer 410 is a one bit [<0, >=0] quantizer, is a 1.5 bit [<0, =0, >0] quantizer, is a two or more bits quantizer, or is any other appropriate quantizer. In the case of a multi-bit quantizer, a fractional tick or multiple ticks as appropriate may be fed back to the summing junction depending on the output of the multi-bit quantizer. In the case of a 1-bit quantizer, the quantizer may determine sign by comparing the MSb of accumulator 408 to 0 or 1 when accumulator 408 counts in two's complement. For a 1-bit quantizer, the output of the quantizer is either +1 or −1 reflecting a decision to add or subtract a tick after the next Y clock ticks. Note that the quantizer makes a decision on accumulator 408 output only once every Y cycles; however, for improved accuracy and increased responsiveness to input commands from a parent tracking system output, the ppm input may be sampled and accumulated by accumulator 408 every W clock ticks, where W is less than Y. In other embodiments, W equals or is greater than Y. When necessary, scaling of the ppm input to the feedback value Z is accomplished in optional gain and scaling block 412. In this case accumulator 408 would run at a rate faster than quantizer 410. In some embodiments, Y=1024 ticks, Z=977 ppm, and W=32 ticks, quantizer 410 is a 1-bit quantizer, and the gain block scales the quantizer output by 31264, equal to (977*32), and delta-sigma timing modulator 400 compensates for frequency errors in the clock up to +/−977 ppm. In some embodiments, W, X. Y, and Z take on values as appropriate to provide a full scale value, transient response, and resolution commensurate with the application in which delta sigma modulator 400 is used.

In some embodiments, Ck is a 32768 kHz clock signal with +50 ppm of frequency error, Y=1024 ticks, Z=977 ppm, W=32 ticks, and X=−50 ppm. In this example, delta sigma modulator 400 either adds or subtracts a tick to main timer 414 every 1024 clock ticks, equivalent to compensating approximately +977 ppm or −977 ppm. The desired ppm value is subtracted from the present compensation ppm value, yielding an error term which is accumulated. The output of quantizer 410 is either +1 or −1 reflecting a decision to add or subtract a tick after the next 1024 cycles. Since W=32, accumulator 408 accumulates X=−50 every 32 clock ticks versus quantizer 410 feedback which is clocked at a 1024 clock tick rate; thus, X is added to accumulator 408 32 times for every time a clock tick is added or subtracted according to the output of quantizer 410. To maintain full-scale range of delta-sigma modulator 400, the feedback value scales quantizer 410 output by 31264, equal to 977*32.

Figure 4B:
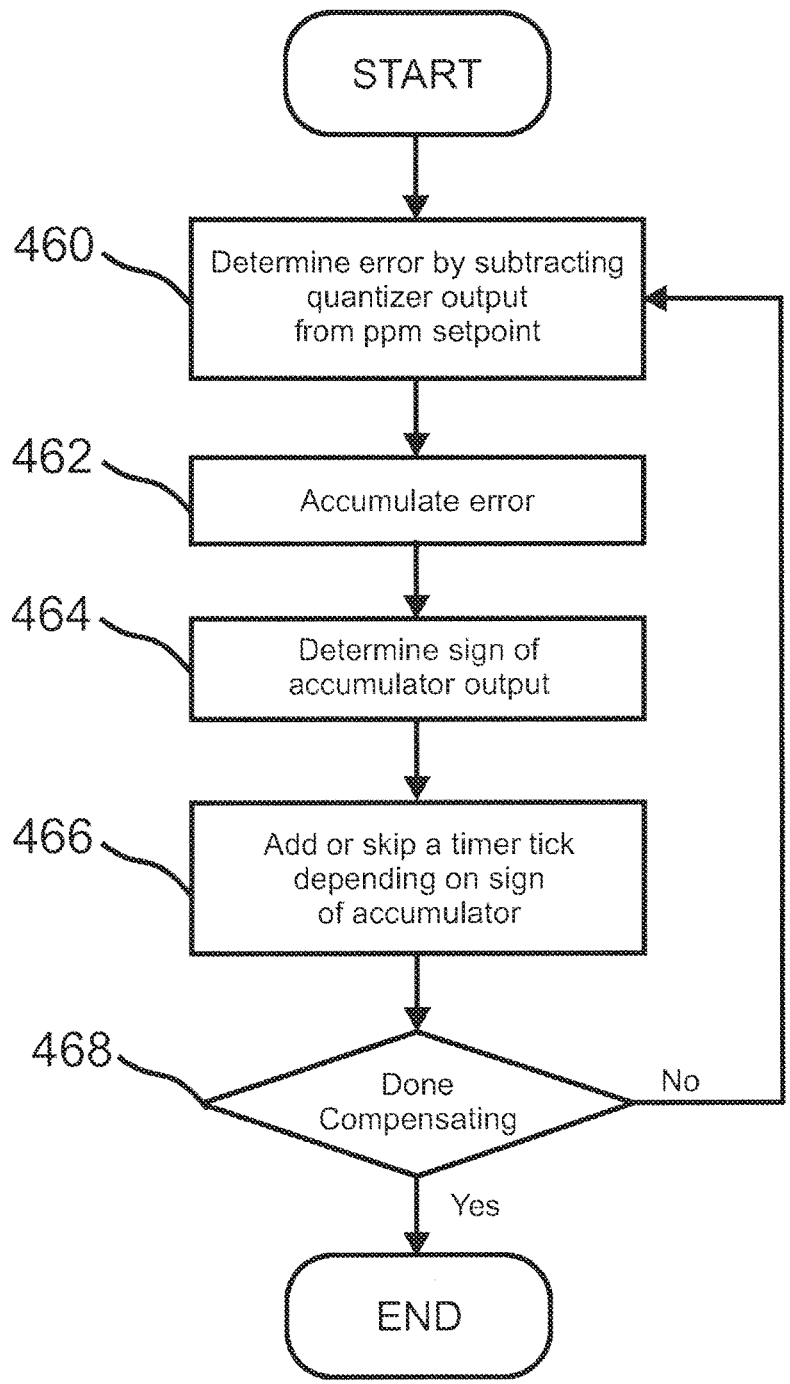
FIG. 4B is a flow diagram illustrating a process of an embodiment of a timing compensator with a delta-sigma modulator.

FIG. 4B is a flow diagram illustrating a process of an embodiment of a timing compensator with a delta-sigma modulator. In 460, error is determined by subtracting quantizer output from ppm setpoint. For example, the error between the desired ppm and the ppm being applied to the main timer is determined. In some embodiments, this error is determined by subtraction. In some embodiments, this error is determined by adding the desired ppm to the accumulator and subtracting the ppm being applied to the main timer from the accumulator. In various embodiments, the main timer or a main timer in conjunction with an adjustment (e.g., an adjustment stored in an accumulator) comprise a time keeper for a node, or any other appropriate timer comprises a time keeper. In 462, the error is accumulated. For example, error is accumulated by adding the error to the sum of previous errors. In 464, the sign of the accumulator is determined. In 466, a timer tick is added or skipped depending on sign of accumulator. For example, a tick is added or subtracted from the main timer, depending on the sign of the accumulator. In 468, it is determined whether compensating is done. In the event that compensating is done, the process ends. In the event that compensating is not done, then control passes to 460.

Figure 5A:
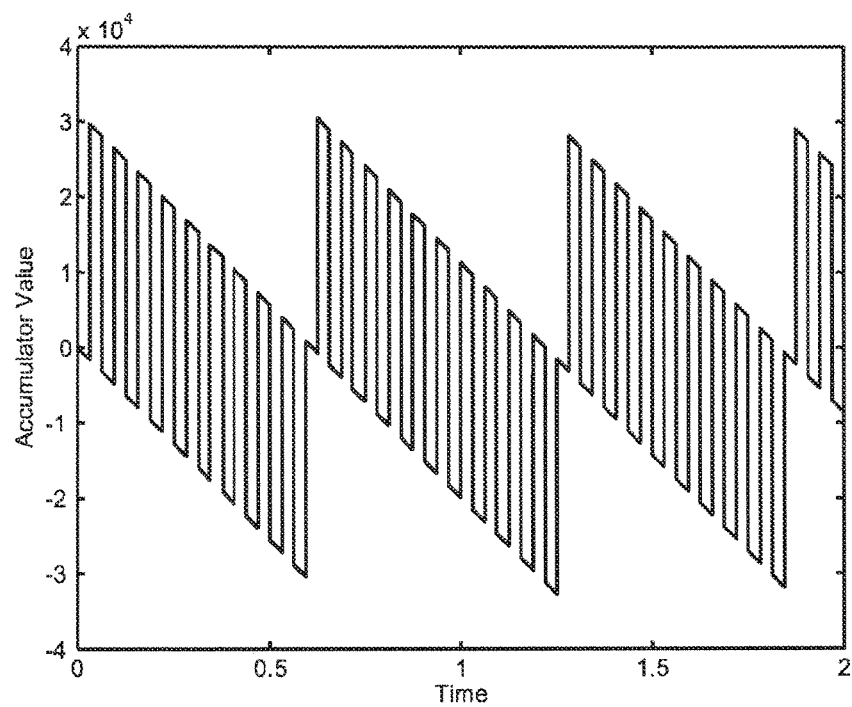
FIG. 5A is a plot illustrating an embodiment of a plot of a simulation of the value at the accumulator output.

FIG. 5A is a plot illustrating an embodiment of a plot of a simulation of the value at the accumulator output. In some embodiments, the plot in FIG. 5A comprises a plot of accumulator 408 output for the above example of W, X, Y, and Z. In the example shown, an accumulator output value is plotted versus time. The accumulator output has an overall envelope whose center value decreases linearly; after 9 or 10 cycles the accumulator output values switch between approximately 0 and $-3 \times 10^4$. Upon reaching the point where the output oscillates between approximately 0 and $-3 \times 10^4$, the wave jumps up to oscillate again between approximately 0 and $3 \times 10^4$ and starts again to drift down linearly.

Figure 5B:
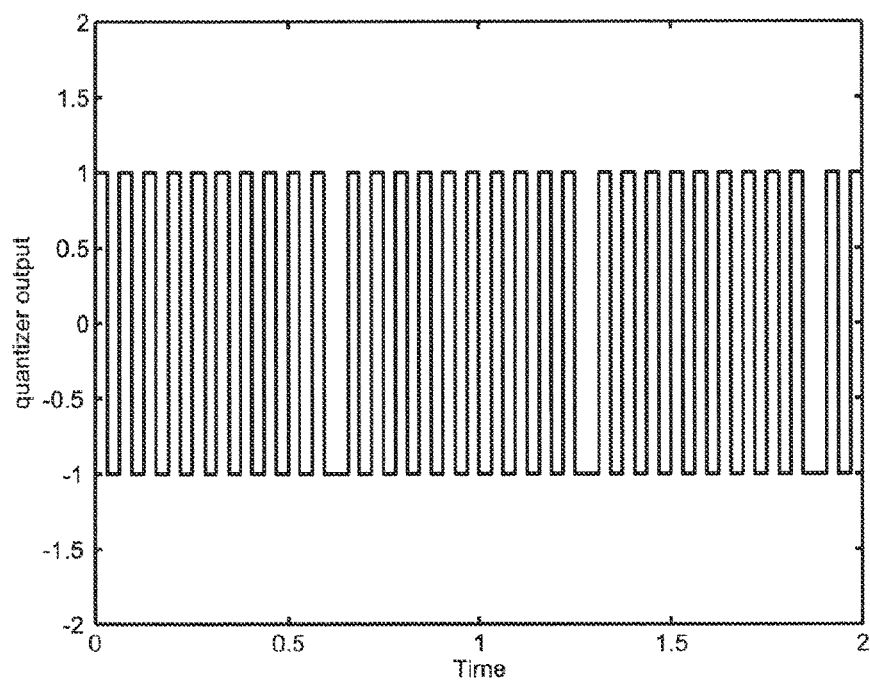
FIG. 5B is a plot illustrating an embodiment of a plot of a simulation of the value at the quantizer output.

FIG. 5B is a plot illustrating an embodiment of a plot of a simulation of the value at the quantizer output. In some embodiments, the plot in FIG. 5B comprises a plot of quantizer 410 output for the above example of W, X, Y, and Z. In the example shown, a quantizer output value is plotted versus time. The quantizer output oscillates in a square wave fashion between 1 and $-1$ with mostly a regular period such that approximately 8 periods are achieved in 0.5 time units. After 9 or 10 periods, the quantizer output stays at $-1$ for approximately an extra half period and then resumes a square wave behavior.

Although delta-sigma loops are nonlinear, certain approximations can help provide insight into the principles of operation. Looking at the output of the modulator (e.g., delta sigma modulator 400), one can see that if we assume the feedback loop is "stable", then the average of the error term at the input to the accumulator (e.g., accumulator 408) will be driven to zero over time. Effectively, this means that the average of the output of the quantizer (e.g., quantizer 410) will track the average of the input. While the modulator keeps track of the average ppm error in ppm space, the quantizer output is also used to add or subtract (skip or hold) a clock tick in the main timer. Thus, the average clock frequency will track the sum of the Ck input frequency plus the input ppm set-point. This mapping is allowable since compensating by +/-Z ppm and adding/subtracting a tick every Y cycles are functionally equivalent.

In some embodiments, further improvement of timing accuracy is desirable. For a single-bit quantizer, a tick is either added or subtracted every Y cycles resulting in a time uncertainty of up to +/-1 clock tick. Although the main timer (e.g., main timer 414) and the accumulator (e.g., accumulator 408) have error, this error is known and reflected by the present value in the accumulator. In various embodiments, a main timer, a main timer in conjunction with an adjustment (e.g., an adjustment stored in an accumulator) comprise a time keeper for a node, or any other appropriate timer. Since the accumulator value integrates the ppm error over time, the instantaneous error may be calculated and used to determine the actual present time to a much higher precision. As an illustrative example, suppose the ppm input X is 0, W=32, Y=1024, the gain block has a gain of 977*32, and the accumulator is initialized to 0 at time zero. After 1024 cycles, the quantizer outputs a "1" which causes a tick to be added to the main timer while simultaneously subtracting 977*32 from the accumulator. Now the accumulator has $-(977*32)$ in it. To find the corrected present time, we take the main timer value and subtract the accumulator divided by a normalization constant. In this example, we divide the accumulator by 256 to yield units of 0.25 us. The accumulator represents how fast the main timer presently is or, alternatively, the negative of how long we need to wait for an event:

$$-(977*32)/256=-122*0.25 \text{ us}=-30.5 \text{ us}$$

Thus, the present time is compensated by subtracting $-30.5$ us, corresponding to waiting 30.5 us beyond the time represented by the value in the counter. Note that 30.5 us is almost exactly one 32.768 kHz clock tick (30.518 us) thereby canceling out the clock tick previously subtracted from the counter to within 18 ns. In this example, the accumulator actually has 122.125 after dividing by 256. The 0.125 was truncated for the calculation of fractional time; however, the 0.125*256 is maintained in the accumulator; the error does not accumulate over time. In some embodiments, the accumulator is not truncated.

When the input signal is not equal to 0 ppm the delta-sigma modulator (e.g., delta sigma modulator 400), modulates the main timer (e.g., main timer 414) to track the input ppm. The accumulator (e.g., accumulator 408) reflects the error between the main timer and the integral of the ppm input. In various embodiments, a main timer or a main timer in conjunction with an adjustment (e.g., an adjustment stored in an accumulator) comprise a time keeper for a node, or any other appropriate timer comprises a main timer.

In some embodiments, an event timer must be able to initiate an event with sub-tick resolution, or time stamp an event with sub-tick resolution, for example $\frac{1}{32}^{nd}$ of a 32.768 kHz clock tick. In some embodiments, a higher frequency crystal oscillator is present and is used as a reference for a radio transceiver. In various embodiments, a 20 MHz crystal oscillator is available; a 16 MHz crystal oscillator is available; any appropriate frequency for radio signal generation is available; a higher-frequency reference for sub-tick timing is available; a microprocessor clock is available; a relaxation oscillator is available, or any other appropriate timing information hardware and/or information. In some embodiments, a higher frequency oscillator is used as a sub-tick timing reference. Note that $\frac{1}{32}^{nd}$ of a 32.768 kHz clock tick is almost exactly equal to nineteen 20 MHz clock cycles or fifteen 16 MHz clock cycles. Making the approximation of $\frac{1}{32}^{nd}$ of a clock tick as nineteen 20 MHz cycles yields a worst case error of less than 120 ns over a full clock tick; if fifteen 16 MHz ticks are used to approximate $\frac{1}{32}^{nd}$ of a 32.768 kHz clock tick, the error is approximately half a microsecond. Using a 20 MHz, or other high frequency oscillator to provide a high-speed clock for a sub-tick timer reference allows corrections derived from the accumulator to be directly added to a countdown timer with a desired sub-tick event time. Additionally, radio communication events are generally synchronized to the high-speed oscillator, so timing radio operations such as start of transmission, or time stamping the time of a packet reception with sub-tick resolution becomes easy and results in no additional quantization noise from clock domain crossings—the event time is inherently in the high-frequency oscillator's space.

Figure 6:
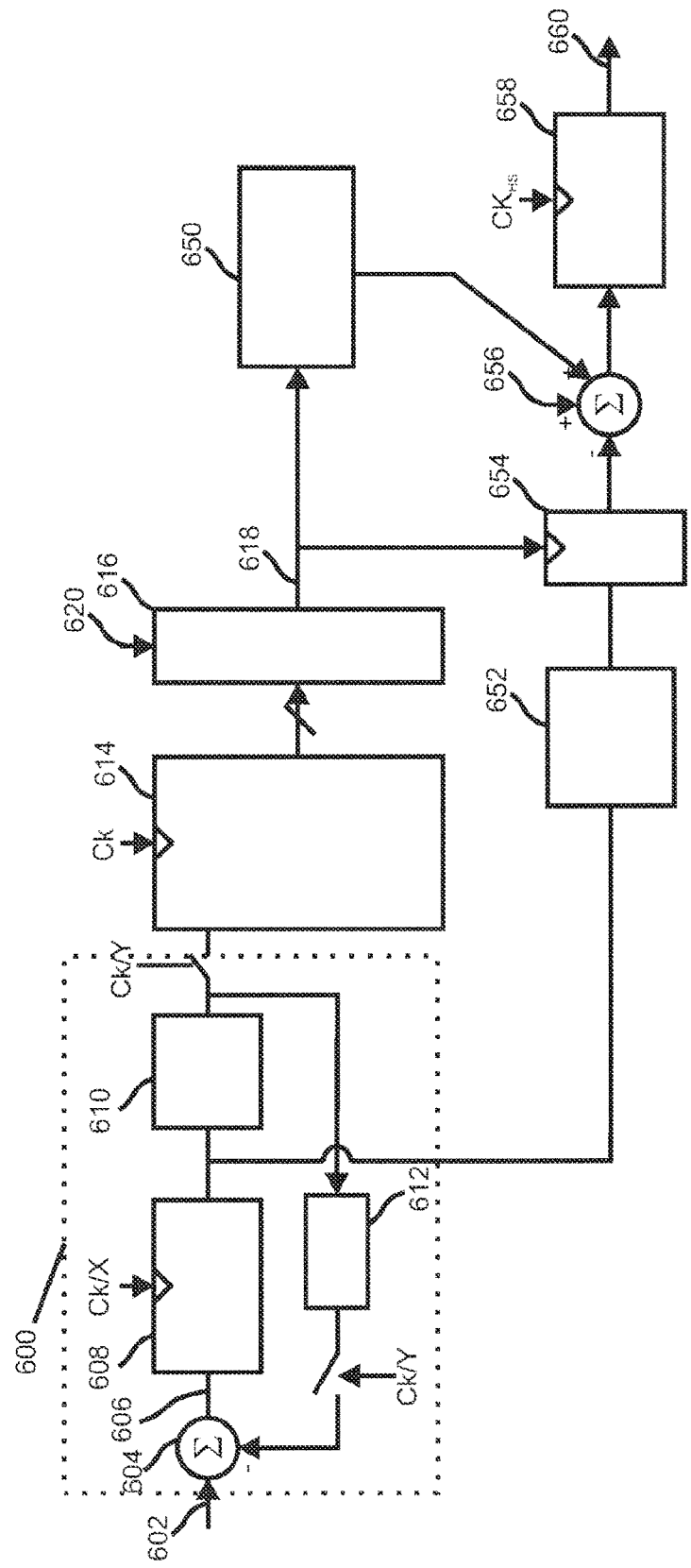
FIG. 6 is block diagram illustrating an embodiment of a delta-sigma timing modulator with sub-tick timing capability.

FIG. 6 is a block diagram illustrating an embodiment of a delta-sigma timing modulator with sub-tick timing capability. In some embodiments, an event with sub-tick timing accuracy represented in fixed-point Q-notation as QA·B is triggered as follows. In the example shown, a main timer compare register 620 is loaded with integer portion A of the event via 620, denoted $T_{MAIN}$. In some embodiments, components 600 through 620 are similar to components 400 through 420 in FIG. 4A. Comparator 616 looks for timer 614 to equal either $T_{MAIN}-1$ or $T_{MAIN}$ and outputs a signal at comparator output 618. $T_{MAIN}-1$ must be considered because accumulator 608 may have positive or negative values; if timer 614 woke up at $T_{MAIN}$ and accumulator 608 indicated the event occurred in negative time the event would have already passed. Usually, comparator 616 will trigger at $T_{MAIN}-1$ at which point accumulator 608 is sampled by register 654, shifted, and converted to an equivalent number of high-speed clock ticks by multiplying in block 652. In some embodiments, block 652 follows 654. Register 654 output is subtracted from the fractional tick portion B (input via input 656) of the event time. Input 656 represents fractional tick portion B multiplied by a number C (where C equals 19 for a 20 MHz reference when the fractional tick portion B represents time in quanta of $\frac{1}{32}^{nd}$ of a clock tick). Counter 658, which in some embodiments is clocked by a 20 MHz clock, counts down until it reaches zero at which point the event is triggered by output 660. In some embodiments, block 652 includes a divide by 256 (or a right shift by 8) operation followed by a multiply by 5 operation and the high-speed clock runs at a frequency of 20 MHz (e.g., using a 20 MHz, or other high frequency oscillator to provide a high-speed clock for a sub-tick timer reference allows corrections derived from the accumulator to be directly added to a countdown timer with a desired sub-tick event time). When comparator 616 triggers at $T_{MAIN}-1$, logic 650 adds a number D to cause the countdown timer to reflect that output 618 occurred 1 clock-tick earlier than loaded into the register, where D equals the quantity six-hundred and ten for a 20 MHz reference: the approximate number of 20 MHz cycles in a clock period.

In this embodiment, if comparator 616 instead triggers at $T_{MAIN}$ a tick must have just been added, so accumulator 608 will be negative, accumulator 608 is sampled and converted to an equivalent number of high-frequency counter ticks by multiplying by E (where E equals 5 for a 20 MHz countdown timer when accumulator 608 output is normalized to represent 0.25 us). This number is subtracted from the fractional tick portion of the event time multiplied by C, and counter 658 counts down until it reaches zero at which point the event is triggered.

Figure 7:
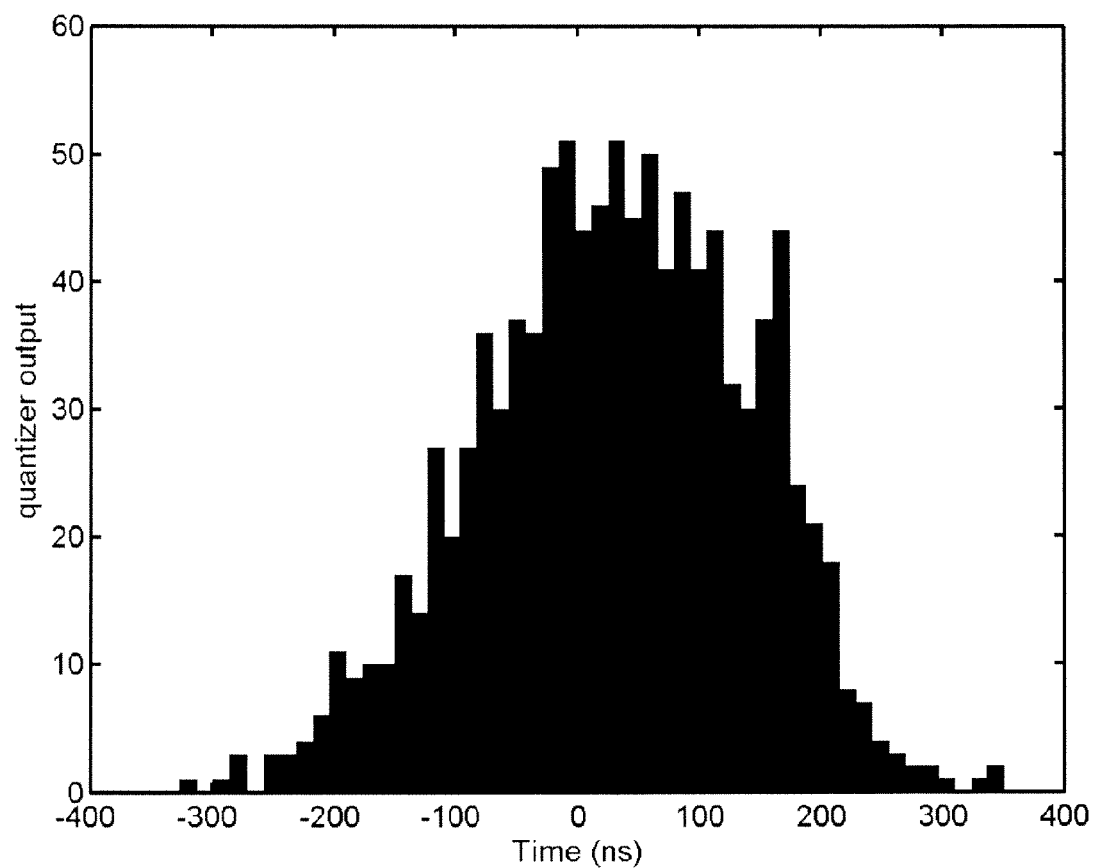
FIG. 7 is a plot of simulated performance of an embodiment of a delta-sigma timing modulator.

FIG. 7 is a plot of simulated performance of an embodiment of a delta-sigma timing modulator. The plot of FIG. 7 is a graph of a histogram of simulated, compensated timing error of one-thousand fifty timer wake-up events. In the example shown, the data was derived by sweeping the crystal error from −200 ppm to 200 ppm by 20 ppm; the ppm input to the modulator was chosen to cancel out the crystal error, which is exactly known in this simulation. At each ppm, a series of 50 simulations was run where a Q32.5 was randomly set to a value between 1 and 100000 and 0 and 31 respectively (0 and 3 seconds total elapsed time).

In some embodiments, the present value of the accumulator is used to determine which clock edge is closer to a desired event start time, without using a sub-tick timing reference. By choosing the closest clock edge, quantization error is cut in half to a maximum of approximately 16 us when a 32 kHz reference is used for the main timer.

In some embodiments, a child node tracks the timing of one or more parent nodes. Tracking timing of a parent node allows lower cost of manufacturing by obviating the need for crystal calibration, as well as providing better timing alignment between child and parent.

Figure 8A:
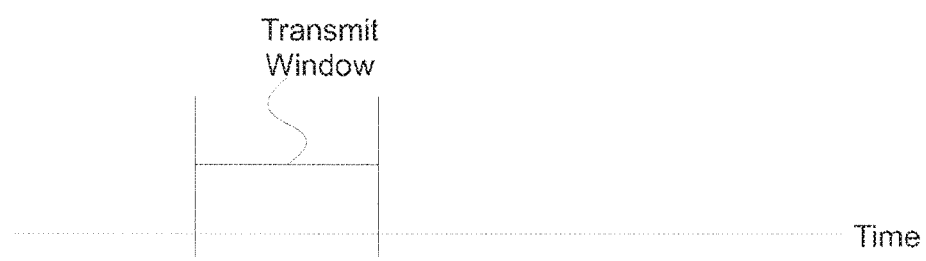
FIG. 8A is a block diagram illustrating an embodiment of a transmit window.

FIG. 8A is a block diagram illustrating an embodiment of a transmit window. In the example shown, a transmit window is shown. The transmit window is a finite period of time (e.g., a timeslot or a portion of a timeslot in a superframe such as superframe 150 of FIG. 1B) during which a transmission may occur between a transmitting node and a receiving node. The transmit windows are defined between the mesh network nodes during a setup of the network. One or more superframes can be used to describe transmitting nodes, receiving nodes, timeslots, and frequencies. One or more superframes can be operational in a mesh network at a given time.

Figure 8B:
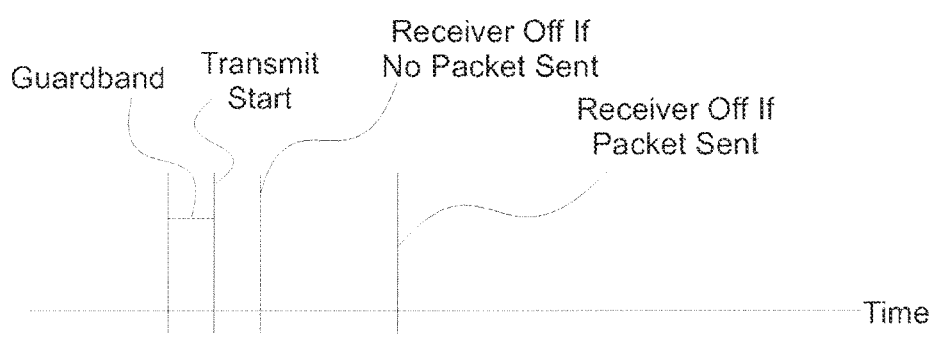
FIG. 8B is a block diagram illustrating an embodiment of a guardband for a receiver.

FIG. 8B is a block diagram illustrating an embodiment of a guardband for a receiver. In the example shown, a guardband is shown prior to the start of transmit for a transmit window. A receiver will turn on its receiver earlier than an expected transmission by the amount shown in the guardband. This guardband is a buffer time that can mitigate the effect of a clock mismatch or drift that may cause the receiver and the transmitter to not be synchronized. The guardband, therefore, ensures that a receiver receives the entire transmission of the transmitter. The receiver will turn off its receiver before the end of the transmit window if no transmission (i.e., no packet) is detected. The receiver will turn off its receiver after a packet has been received, which can be near the end of the transmit window. Clearly, reducing the required size of the guardband is advantageous for a low-power network as the radio receiver energy (e.g., power used by the receiver*time that the receiver is on) is reduced per each listen. In some embodiments, on average, a receiver will listen for half of the guardband before hearing the start of a transmitted packet.

Figure 9:
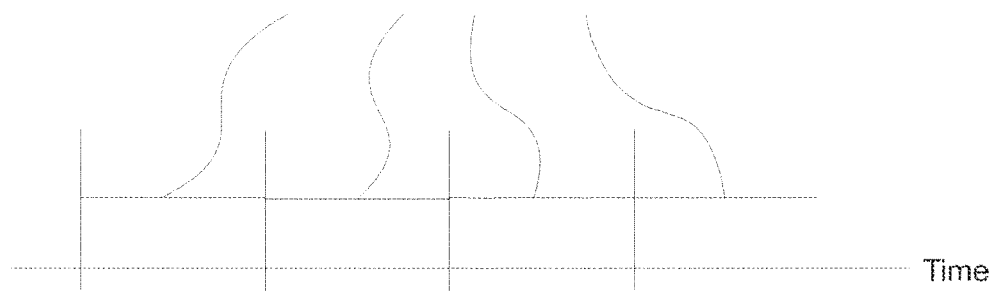
FIG. 9 is a diagram illustrating an embodiment of a packet interval with timing information.

FIG. 9 is a diagram illustrating an embodiment of a packet interval with timing information. In some embodiments, the packet interval with timing information comprises a keep-alive interval. In the example shown, a packet is sent to a receiver at a regular interval. In some embodiments, the packet interval is irregular; for example when data packets are sent over the mesh network at a random or deterministic interval. In some embodiments, there is a minimum packet interval and packets sometimes are sent at a rate above the minimum packet interval; for example, a keep-alive is periodically sent to maintain synchronization between parent and child in addition to data passed along the network. In various embodiments, timing information is sent in the header of a data packet, a keep alive packet, an acknowledgement packet, or in any other appropriate packet. In some embodiments, the arrival time of a packet compared to when the packet was expected represents a timing error and is used to adjust the time and the clock frequency of one or both nodes. In some embodiments, arrival of a defined portion of the packet (e.g., a start-of-frame delimiter, a packet length field, a CRC field, etc.) causes the clock to be sampled by hardware, such as a latch, to form a timestamp of packet arrival which is used to calculate a timing error. In some embodiments, the clock includes a tick portion and a sub-tick portion. In some embodiments, a timing error of a first node is measured by measuring the arrival of a packet from a second node with respect to a local time on the first node; for example, a downstream packet or source-routed packet. In some embodiments, a timing error of a first node is measured by measuring the arrival of a packet from the first node by a second node with respect to a local time on the second node. In some embodiments, a timing error of a first node is measured by measuring the arrival of a packet from the first node by a second node with respect to a local time on the second node and sending the measured timing back to the first node; for example, the measured timing is set back to the first node using an upstream packet or a keep-alive packet. In some embodiments, a timing error is measured using a timing error measurer. In various embodiments, a timing error measurer comprises hardware, software, a combination of hardware and software, or any other appropriate implementation.

In some embodiments, the timing error is used to adjust the first node's clock so that it can be better synchronized to the second node's clock. In some embodiments, the second node is synchronized to a third node's clock which in turn is synchronized to another node's clock and so on up a chain until an access point is reached, so that all nodes in the chain are synchronized to the access point clock. In some embodiments, the second node, and all other nodes within a mesh network are synchronized to a common time base, such as an access point clock. In some embodiments, a network includes a plurality of access points, and nodes in the network are synchronized to one or more access points. In some embodiments, an access point is synchronized to another access point's clock. In some embodiments, an access point or a node is synchronized to an external time source such as a GPS-based time or clock or a clock or a time queried from the internet. Synchronization of one node to another node through a parent-tracking system provides several advantages. For example, if a node is synchronized using a parent-tracking system, requirements on crystal calibration or characterization accuracy may be reduced or even eliminated. Relaxing crystal calibration or characterization requirements enables lower-cost products to be manufactured, since low-cost uncalibrated crystal or other time-keeping oscillators may be used at a printed circuit board assembly step as opposed to requiring accurate calibration of crystal temperature performance. Parent-tracking of a node can compensate for the effects of long-term crystal drift so that a node's synchronization does not degrade over time. Parent tracking provides robust disturbance rejection during temperature ramping. Another advantage of such a system is that lower synchronization error may be attained than without a parent-tracking system. Lower synchronization error allows nodes to operate with shorter guardbands translating to less power used for receiving. Alternatively, the network can operate with the same level of synchronization error and obtain this by a longer keep-alive interval which reduces receiving and transmitting power. Better frequency synchronization will increase immunity to lost keep-alive or poor communication stability. Lower synchronization error also facilitates precision synchronized sampling throughout the network or time stamping throughout the network.

In various embodiments, a time keeper for a node comprises a clock, a time keeper comprises a counter driven by an oscillator, a time keeper comprises a counter driven by an oscillator the oscillator having a frequency adjustable with a variable load capacitance (either digital or analog), a time keeper comprises a counter driven by an oscillator with the counter having an input that allows counts to be periodically added or subtracted to maintain a better sense of time, a time keeper comprises a watch crystal having a resonance of approximately 32.768 kHz, or any other appropriate way of maintaining a sense of time.

Throughout this description when the term filter is used, the filter in various embodiments comprises a gain of 1, a gain of less than 1, a negative gain, or a gain greater than 1. Generally, in various embodiments, filters are implemented as continuous-time filters, as discrete-time filters, as a mixture of continuous-time filters and discrete-time filters, or any other appropriate implementation for a filter.

In some embodiments, timing error is used to adjust the clock frequency on the first node so that the sense of local time on the first node more accurately tracks the sense of time on the second node. In various embodiments, the clock frequency on the first node is adjusted via a sigma-delta timing modulator; adding or subtracting ticks; adding or skipping ticks; adjusting a load capacitance on a crystal oscillator via a capacitor array, varactor, or varactor array; or any other appropriate method of adjusting a clock frequency.

Figure 10A:
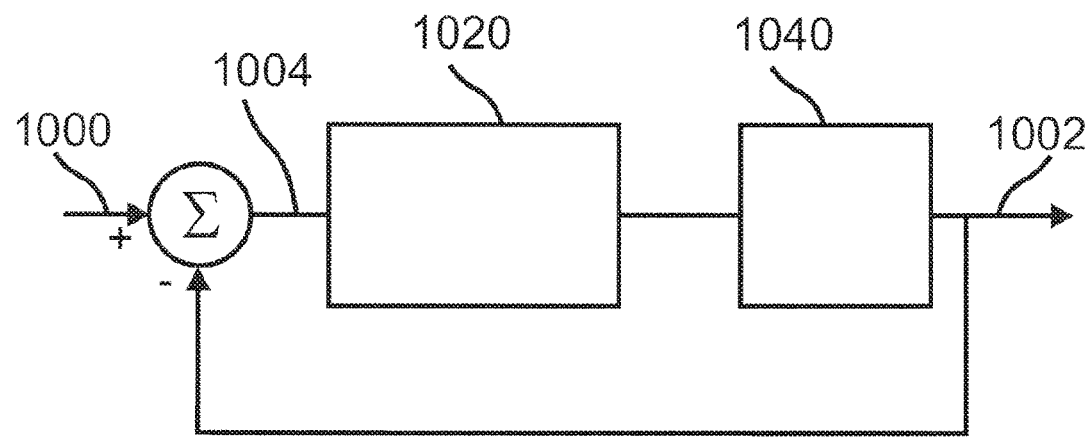
FIG. 10A is a block diagram illustrating an embodiment of a system for tracking a second node's frequency.

FIG. 10A illustrates an embodiment of a system for tracking a second node's frequency. To aid in teaching, the terms master and slave will be used in conjunction with FIG. 10A to signify the node to be tracked in time and the node that tracks in time. In the example shown, master input 1000 receives a representation of a time of transmission or reception of a packet as appropriate, for example a time of transmission in a downstream packet or a time of reception in an upstream packet or a keep-alive. Slave time 1002 represents the expected time of reception or transmission, as appropriate. A timing error 1004 is formed by subtracting slave time 1002 from master input 1000. Timing error 1004 passes through filter 1020 to condition the error signal. The output of filter 1020 is coupled to adjustable timekeeper 1040. Adjustable timekeeper 1040 adjusts the slave's sense of time in response to the output of the filter. In some embodiments, adjustable timekeeper 1040 counts cycles from a 32 kHz oscillator when the input to the adjuster is zero; when the input to the adjuster is non-zero, ticks are added, subtracted, or skipped as appropriate. In various embodiments, adjustable timekeeper 1040 comprises a sigma-delta timing modulator, one or more counters, or any other appropriate hardware configuration for adjusting timekeeping. Slave time 1002 output represents a sense of time on the slave that tracks the master's time, and as such may be used to schedule events via a hardware or software event timer for example.

Figure 10B:
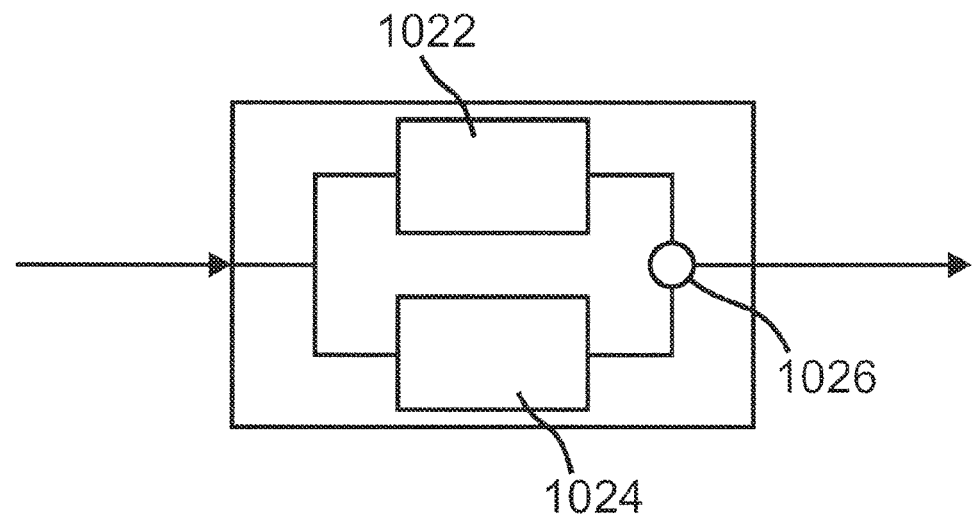
FIG. 10B is a block diagram illustrating an embodiment of a filter.

FIG. 10B is a diagram illustrating an embodiment of filter. In some embodiments, the filter of FIG. 10B is used to implement filter 1020. In the example shown, the filter comprises differentiator 1022 having a gain $K_D$ in parallel with filter 1024. The outputs of differentiator 1022 and filter 1024 are added at summer 1026. In various embodiments, the system operates as a continuous-time system, a discrete-time system, or a mixed discrete-time/sampled-data system. When an error exists between a master and slave, differentiator 1022 provides a pulse to an adjustable timekeeper (e.g., adjustable timekeeper 1040 of FIG. 10A) to bring the time of a slave clock closer to a master clock. Filter 1024 provides a signal to the adjustable timekeeper to bring the slave clock frequency closer to the master clock frequency so that the slave clock diverges less from the master clock over time. Filter 1024 comprises an integrator in some embodiments.

In some embodiments, the input to the adjustable timekeeper is adjusted targeting minimizing a timing error measurement (e.g., a timing error measurement between a clock of a first node and a clock of a second node).

In some embodiments, the system is operated in a discrete-time fashion, sampled only when new timing errors are available; in these embodiments filter 1020 comprises a constant gain path in parallel with a filter similar to 1024.

Figure 11A:
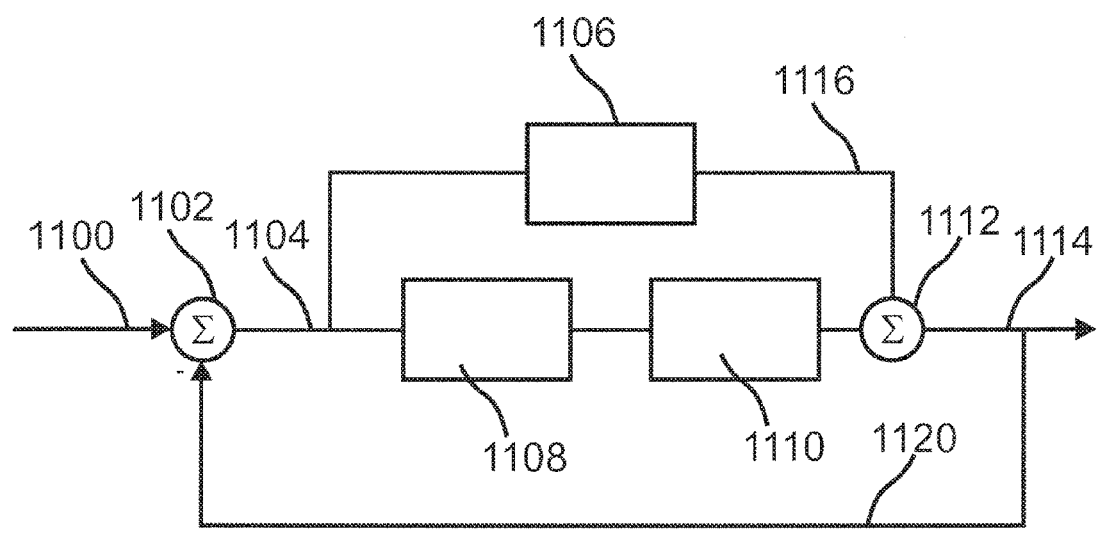
FIG. 11A is a block diagram illustrating an embodiment of a system for tracking a second node's frequency.

FIG. 11A is a block diagram illustrating an embodiment of a system for tracking a second node's frequency. In the example shown, master input 1100 receives a representation of a time of transmission or reception of a packet as appropriate: for example, a time of transmission in a downstream packet or a time of reception in an upstream packet or a keep-alive. Slave time 1114 represents the expected time of reception or transmission, as appropriate. Timing error 1104 is formed by subtracting slave time 114 from master input 1100. Timing error 1104 passes through filter 1108 to condition the error signal. Additionally, the error signal is filtered by feed-forward filter 1106 and fed forward by signal path 1116, bypassing filter 1108 and adjustable timekeeper 1110 and is summed at summing junction 1112. In various embodiments, feed-forward filter 1106 comprises an integrator, a leaky integrator, a low pass filter, a band pass filter, or any other appropriate filter. The output of filter 1108 is coupled to adjustable timekeeper 1110. A leaky integrator or low pass filter generally causes the feed-forward term to decay to zero over time, allowing filter 1108 to provide the compensation necessary for proper timeslot alignment. Slave time 1114 output represents a sense of time on the slave that tracks the master's time, and as such may be used to schedule events via a hardware or software event timer for example. In various embodiments, filter 1108 comprises an integrator, an integrator with gain, an integrator with gain coupled to a finite impulse response filter such as a sine filter, a double integrator with gain and a compensation zero, or any other appropriate filter.

In some embodiments, the feed-forward filter 1106 output is added to a frequency-adjuster output via a digital adder. In some embodiments, summing junction 1112 and/or feed-forward filter 1106 is an integral part of an adjustable timekeeper. In some embodiments, feed-forward filter 1106 and summing junction 1112 are integrated into an adjustable timekeeper by feeding forward error term 1104 directly into a counter similar to 414 of FIG. 4A or 614 of FIG. 6, in which case the feed-forward path would connect to an additional input to the adjustable timekeeper instead of summing junction 1112. In some embodiments, one or both summing junctions (e.g., summing junction 1112 and/or summer 1102) are implemented in software. In some embodiments, one or both summing junctions e.g., summing junction 1112 and/or summer 1102) are implemented in hardware.

In some embodiments, a slave node has two or more masters to which it is synchronized. In various embodiments, the communication between master and slave is initiated by the master, initiated by the slave, initiated by either one in a pre-determined pattern, or initiated by either one in an asynchronous manner. In various embodiments, each master communicates with the slave at the same pre-determined fixed rate, at a rate different than other masters, or any time-varying combination thereof. The slave uses each update that it receives from a master as a timing correction input to the system. In some embodiments, the timing error is determined by measuring the timing error between each master and the slave's time sequentially as updates are received, independent of which master sent the update. In some embodiments, the timing error for each master is determined by measuring the timing error difference between the present update and the previous update of the same master. In some embodiments, separate feed-forward adjustment (e.g. similar to the branch comprising feed-forward filter 1106 and 1116 of FIG. 11A), or separate frequency adjustment, or both are used for each separate master. In some embodiments, the timing error or timing error difference is normalized by dividing by the elapsed time as estimated by the slave to form a representation of frequency error. In some embodiments, the timing error or timing error difference is not normalized, instead being a quantity representative of the timing error. Presenting an un-normalized time to the system is beneficial when updates can happen frequently in which case normalization could result in large errors due to quantization. In some embodiments, a leaky integrator or low pass filter in 1106 causes the feed-forward term to decay to zero over time, allowing filter 1108 to provide the compensation necessary for proper timeslot alignment to all masters with a single time base.

In some embodiments using a discrete-time or sampled-data implementation, a unit-delay (for example $z^{-1}$) is inserted in feedback path 1120 and master input 1100 before summing junction 1102 so that the system operates on an error term that is based on measurements that have occurred. In some embodiments which incorporate a unit-delay in the feedback path 1120 and the master input 1100 before the summing junction output 1102, output 1114 represents a sense of present time or time in the future.

Figure 11B:
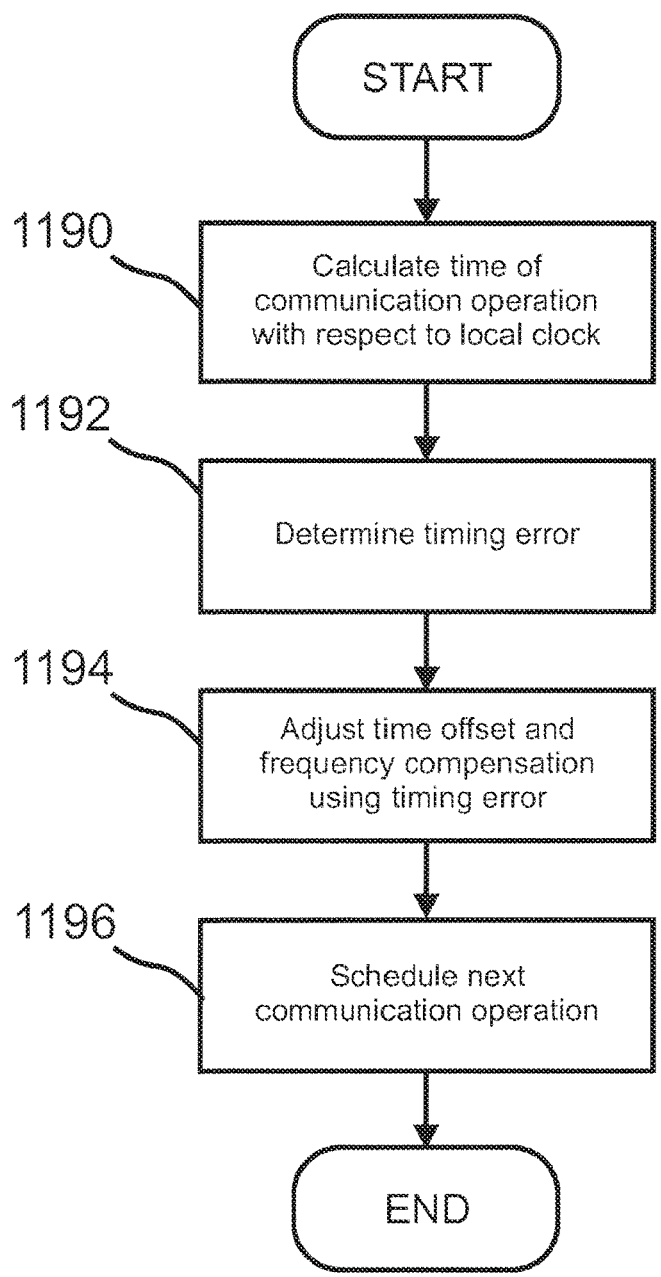
FIG. 11B is a flow chart illustrating an embodiment of a system for tracking a second node's frequency.

FIG. 11B is a flow chart illustrating an embodiment of a system for tracking a second node's frequency. In the example shown, the following steps repeat each time a new time error update is received via a communication operation which may be either a transmit operation or a receive operation. In 1190, time of communication operation is calculated with respect to local clock. In the event that the communication operation is a receive operation, the expected receive time according to the local clock is calculated. In the event that the communication operation is a transmit operation, the transmission time according to the local clock is calculated. In 1192 timing error is determined. In the event that the communication operation is a transmit operation, timing error is received in an acknowledgement to a transmit operation. In the event that the communication operation is a receive operation, timing error is calculated. In 1194, the timing error is used to adjust time offset and frequency compensation. In 1196 the next communication operation is scheduled. The scheduling takes into account the time offset determined in 1194.

Figure 12A:
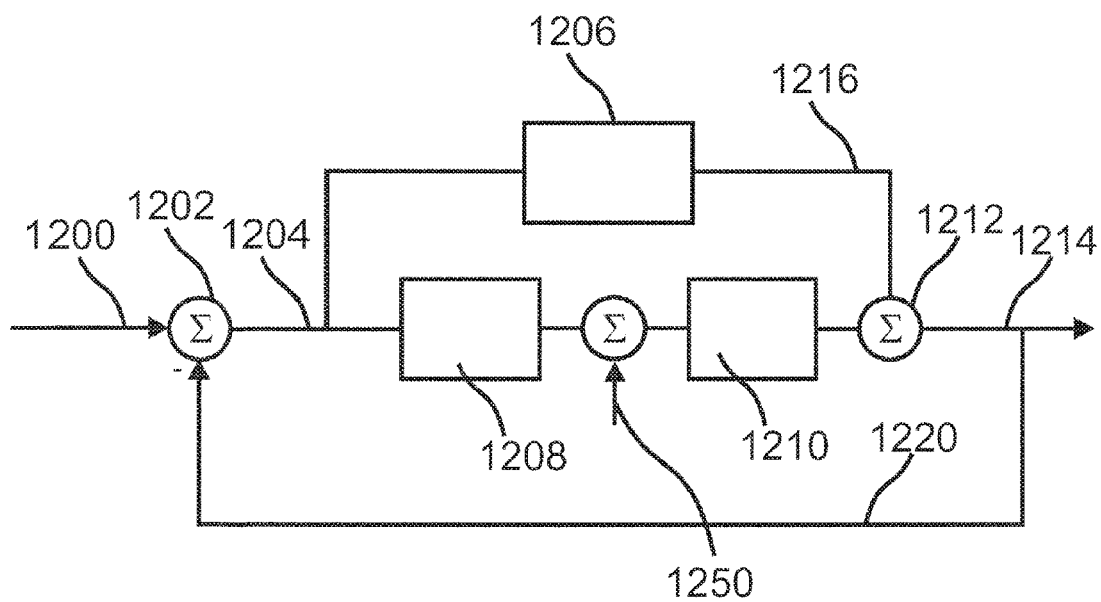
FIG. 12A is a block diagram illustrating an embodiment of a system for tracking a second node's frequency.

FIG. 12A is a block diagram illustrating an embodiment of a system for tracking a second node's frequency. In the example shown, 1200 through 1220 of FIG. 12A are similar to 1100 through 1120 of FIG. 11A. Expected frequency correction term 1250 based upon measured node temperature is input to the adjustable timekeeper to relax the requirements on the parent-tracking loop. In some embodiments, expected frequency correction term 1250 is generated by calibration or characterization as described earlier.

In some embodiments, measurements of temperature local to a node and the input to an adjustable timekeeper (e.g., adjustable timekeeper 1110 or adjustable timekeeper 1210) are used to derive a correction coefficient to anticipate a node's oscillator frequency. This allows the node to learn its temperature variation curve to a better accuracy than measured in low-cost calibration techniques. This correction coefficient may be used to improve the accuracy of a frequency correction term, such as 1250. In some embodiments, a table is constructed having entries for node temperature and an oscillator ppm correction factor based upon the input to an adjustable timekeeper (e.g., adjustable timekeeper 1110 or adjustable timekeeper 1210). In some embodiments, an average of the input to an adjustable timekeeper (e.g., adjustable timekeeper 1110 or adjustable timekeeper 1210) is constructed over an extended period of time, such as several minutes to several days. An average of the node's temperature over this same period is also constructed. Based upon two or more average temperature and average adjustable timekeeper input measurements, a linear correction term may be calculated to compensate for oscillator behavior over an extended temperature region. In various embodiments, a linear correction term is applied over a subset of the operating temperature range, or the full set of operating temperatures. When a radio oscillator is used to determine 32 kHz frequency at a given temperature, excellent wide-range crystal correction may be attained since residual errors from a typical ppm versus temperature curve are mostly reflected in a variation in a linear polynomial term.

Figure 12B:
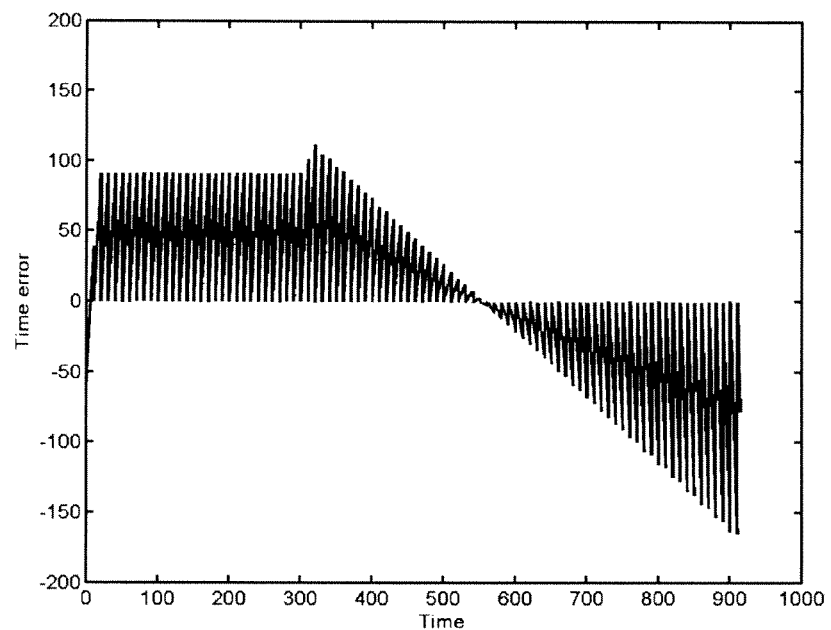
FIGS. 12B and 12C are plots illustrating embodiments of timing performance.
Figure 12C:
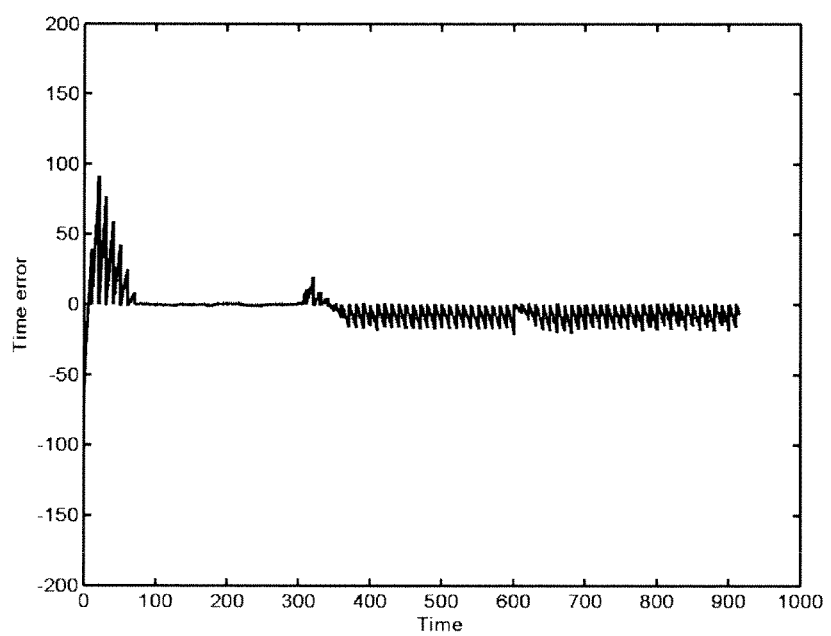

FIGS. 12B and 12C are plots illustrating embodiments of timing performance. In the examples shown, FIGS. 12B and 12C show simulated time drift of a slave node as it is ramped from −40 C to 120 C with respect to a master node at a constant temperature of 25 C. A frequency correction term is used with an assumed error of 0.14 ppm/C with zero error at 25 C. The X-axes have units of seconds. The Y-axes have units of micro-seconds. FIG. 12B was simulated using zero gain in a filter similar to 1208 so that the adjustable timekeeper input is held at zero (no frequency compensation). FIG. 12C was simulated with a filter similar to 1280 having an integrator function with a finite-impulse response (FIR) filter and a nominal 1/(10 second) gain. As can be seen, use of the adjustable timekeeper in a feedback loop substantially improves tracking performance of the slave node to the master node.

If two nodes are drifting in time relative to each other, they will eventually drift out of synchronization. Consider the case where two nodes are initially synchronized in a wireless network. The wireless network comprises a child node, which comprises a transmitter, a receiver, and a first time keeper; and a parent node, which comprises a transmitter, a receiver, and a second time keeper. In some embodiments, the parent node receiver is active for a guardband and the guardband is adjusted to maintain synchronization of the parent node with the child node. If the child node drifts for more than the guardband away from the parent node, the parent node can no longer receive transmissions from the child node nor vice versa and the nodes can no longer function as components of a time-synchronized network. In some embodiments, the child node undergoes a reset and a rejoin process to synchronize to the network again. This reset and rejoin process can result in lost data, extra charge consumed (e.g., power consumed), and further reset events at dependent nodes, so it is desirable to minimize total synchronization loss between nodes.

Figure 13:
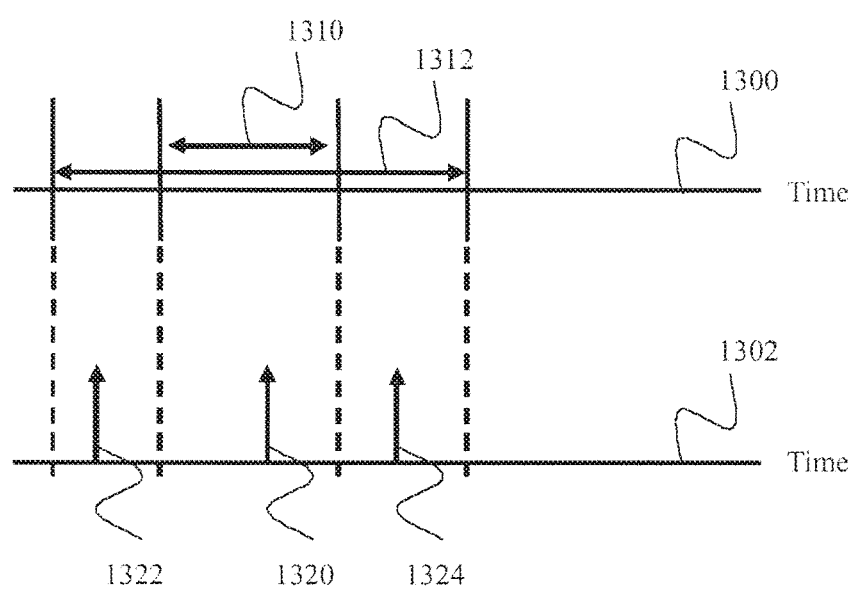
FIG. 13 is a plot illustrating an embodiment of a timeslot where a parent node is receiving a packet from a child node.

FIG. 13 is a plot illustrating an embodiment of a timeslot where a parent node is receiving a packet from a child node. In the example shown, a parent follows timeline 1300 and the child follows timeline 1302. The parent activates its receiver on the prescribed channel frequency for the interval of time specified by guardband 1310. Providing that the nodes are well synchronized, the transmission 1320 from the child lies within guardband 1310 and the nodes exchange packets and timing information by transmitting and receiving a packet during guardband 1310. If, however, the transmission from the child comes too early for guardband 1310 (e.g., transmission 1322) or too late for guardband 1310 (e.g., transmission 1324), then the parent will not receive the message; Of course, the nodes then do not exchange packets and timing information.

In some embodiments, a parent node adjusts a guardband time interval when there is danger of losing synchronization. In some embodiments, the guardband adjustment comprises lengthening the guardband in response to a long elapsed time since a last received message. The longer the interval between received messages, the greater the danger of losing synchronization, so a threshold amount of time can be used to trigger the guardband adjustment. In some embodiments, the guardband adjustment comprises lengthening the guardband in response to a pre-determined number of keep alive intervals passing without a packet being received. The parent node expects one or more packets from the child node per keep alive interval, so the danger of losing synchronization increases with the number of expired keep alive intervals. For example, if the keep alive interval is 30 s and the parent has not received a message in four such intervals, or 120 s, then the parent node increases its guardband time interval. In the event that a node (e.g., the parent node) increases its guardband (e.g., similar to the increase shown as guardband 1312 in FIG. 13 from guardband 1310), it allows the parent node to hear both an early transmission outside of the original guardband (e.g., 1322 which lies outside of guardband 1310) and a late transmission (e.g., 1324 which lies outside of guardband 1310) from the child node. In some embodiments, the guardband adjustment comprises lengthening the guardband to a length large enough so the beginning of a receive operation crosses into a previous timeslot.

Figure 14:
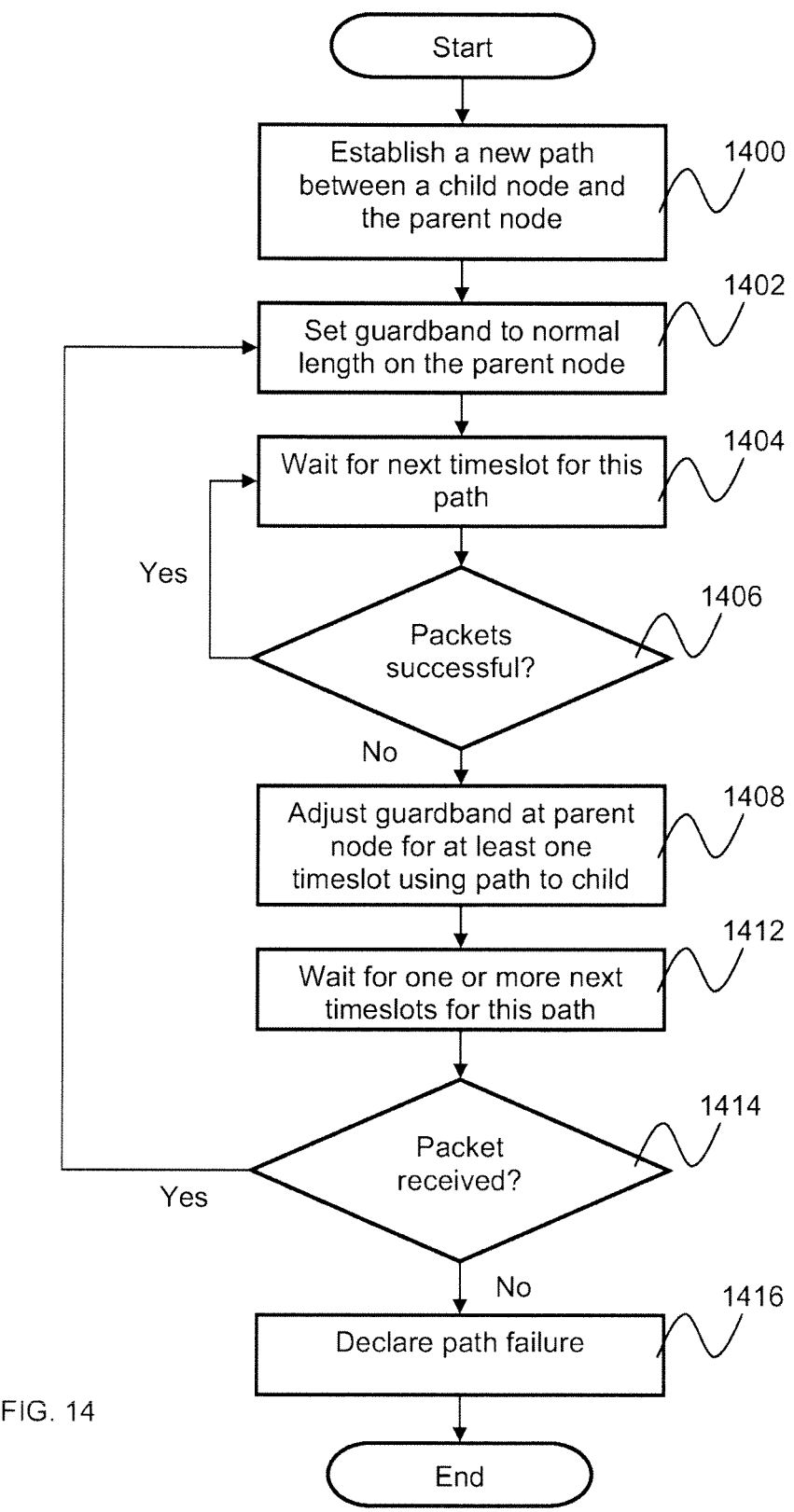
FIG. 14 is a flow diagram illustrating an embodiment of a process to adaptively set guardbands at a parent node.

FIG. 14 is a flow diagram illustrating and embodiment of a process to adaptively set guardbands at a parent node. In some embodiments, the process of FIG. 14 is run for each path associated with the parent node. In the example shown, in 1400, a new path is established between a child node and the parent node. In various embodiments, the path is established through the addition of links by a manager, through unscheduled communication between two nodes, or through any other appropriate process. In 1402, the guardband on a parent node that is to be used on the path is set to normal width (e.g., guardband 1310 in FIG. 13). In 1404, the parent node waits for the next timeslot for this path. In that next timeslot, the parent node expects to receive a packet. In 1406, it is determined whether the packets are successful. In various embodiments, a packet is not successful in the event of one of the following: a long elapsed time since a last received message, a pre-determined number of keep alive intervals passing without a packet being received, a measured timing error between the first time keeper and the second time keeper being above a threshold, or any other appropriate criterion for a packet being unsuccessful. In the event that packet is determined to be successful, control passes to 1404. In 1404, the parent node again waits for the next timeslot for this path. In the event that packets are determined to be unsuccessful, in 1408 the guardband for this path is adjusted for at least one timeslot using the path to the child (e.g., to guardband 1312 in FIG. 13). In some embodiments, the guardband is adjusted for all timeslots using the path to the child. In 1412, the parent node waits for one or more next timeslots for the path. In 1414, it is determined if a packet is received. For example, a parent node determines if a packet has been received from a child node. In the event that a packet is received, control passes to 1402. In 1402, the parent restores the guardband to its normal length. In the event that a packet is not received, then in 1416 a path failure is declared. For example, the path from the parent node to the child node is declared a failure: then the process ends. In various embodiments, a declaration of a path failure comprises one of: deleting all links on the path, sending an error message to a network manager, or any other appropriate response. In various embodiments, the transition from 1414 to 1402 is conditional on receiving a plurality of packets, a timing error less than a defined threshold, or any other appropriate condition.

While the parent node mitigates the danger for synchronization loss by adjusting the guardband for timeslots on the path, the child node mitigates the danger of synchronization loss by adjusting the frequency of transmissions to the parent node. In some embodiments, the frequency of transmissions is dictated by a keep alive interval which is tuned (e.g., adjusted to be more frequent or less frequent). In some embodiments, the child node sends a keep alive to the parent node, wherein the keep alive interval is adjusted to maintain synchronization of the child node and the parent node. Shorter keep alive intervals provide more synchronization opportunities.

In the event that the child node detects a large timing error during a synchronization event with a parent node, this indicates an increased danger of synchronization loss. In some embodiments, adjusting the keep alive interval comprises shortening the keep alive interval in response to a timing error measurement. In some embodiments, adjusting the keep alive interval comprises shortening the keep alive interval in inverse proportion to a timing error measurement. In some embodiments, the keep alive interval is shortened to a level which results in child node transmissions being sent during all links using the path.

Figure 15:
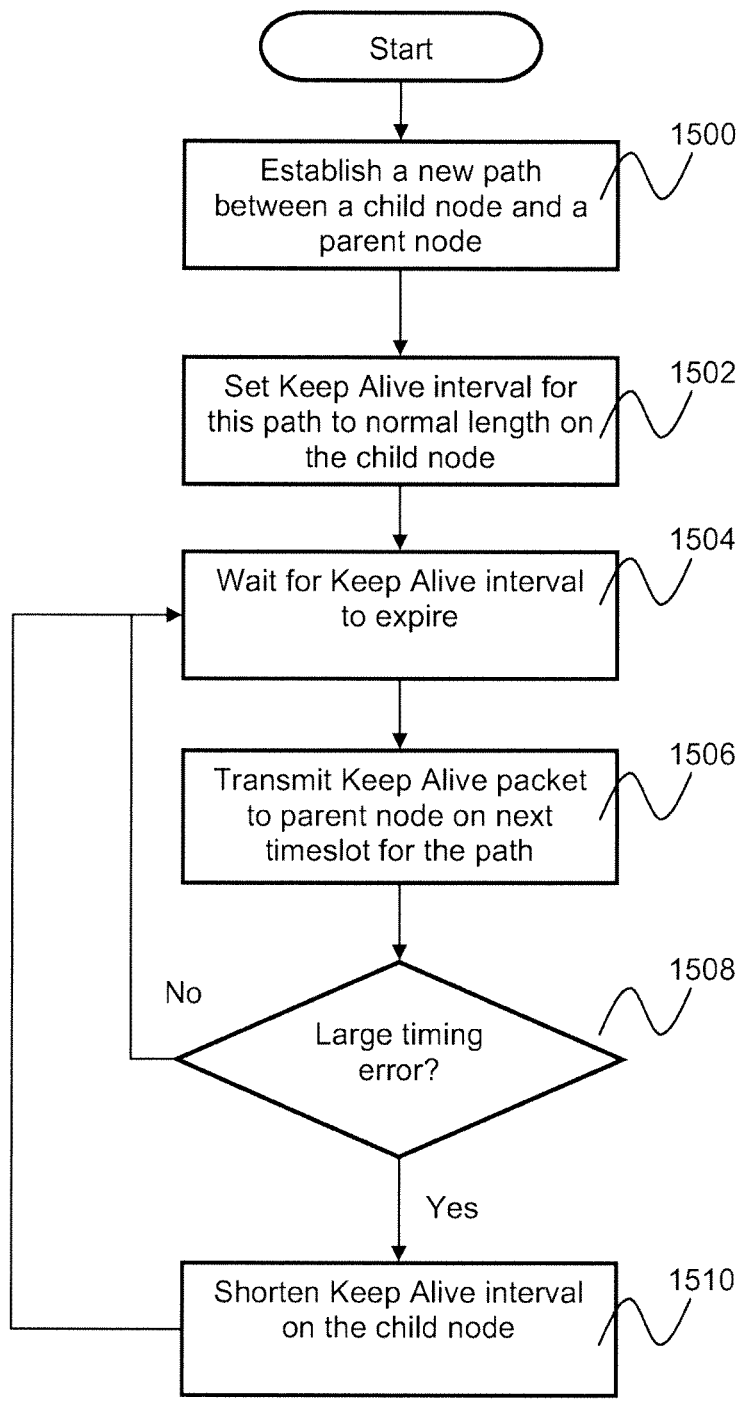
FIG. 15 is a flow diagram illustrating an embodiment of a process to adaptively set the keep alive interval at a child node.

FIG. 15 is a flow diagram illustrating an embodiment of a process to adaptively set the keep alive interval at a child node. In the example shown, in 1500, a new path is established between a child node and the parent node. In various embodiments, the path is established through the addition of links by a manager, through unscheduled communication between two nodes, or through any other appropriate process. In 1502, the keep alive interval for the path is set to the normal length. In 1504, the child node waits for the keep alive interval to expire. In 1506, the child node transmits a keep alive packet to the parent node on the next timeslot for the path. In 1508, it is determined whether there is a large timing error. For example, the child node checks the response from the parent to the keep alive packet and determines if there is a large timing error. In the event that there is not a large timing error, control passes to 1504. For example, in 1504 the child node again waits for the keep alive interval to expire. In the event that there is a large timing error, control passes to 1510. In 1510, the child node adjusts its keep alive interval before returning to 1504 and again awaits for keep alive interval, now adjusted to a new length of time, to expire.

In some embodiments, adjusting the keep alive interval comprises shortening the keep alive interval in response to a change in temperature. For example, if the temperature on the child changes substantially over a short period of time, the timing accuracy with respect to the parent will generally be worse than if there were no changes in temperature (e.g., the node experiences one or more thermal transients).

In some embodiments, the parent node adjusts the guardband in response to a change in temperature.

Figure 16:
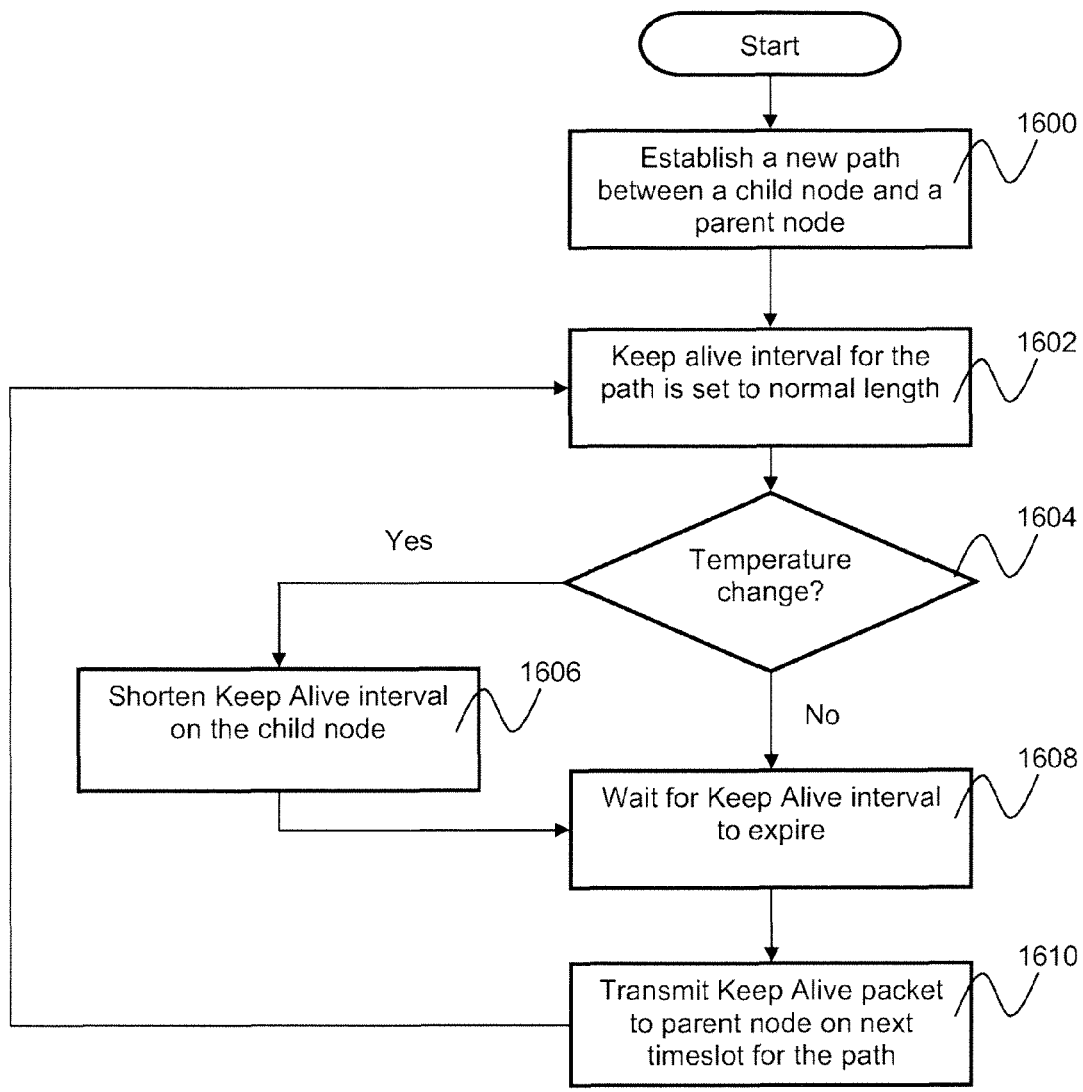
FIG. 16 is a flow diagram illustrating an embodiment of a process to adaptively set the keep alive interval at a child node.

FIG. 16 is a flow diagram illustrating an embodiment of a process to adaptively set the keep alive interval at a child node. In 1600, a new path is established between a child node and the parent node. In various embodiments, the path is established through the addition of links by a manager, through unscheduled communication between two nodes, or through any other appropriate process. In 1602, the keep alive interval for the path is set to the normal length. In 1604, it is determined whether the temperature changed. For example, the child node determines if it has undergone a significant temperature change. In the event that the temperature has not changed, control passes to 1608 where the child node waits for the keep alive interval to expire. In the event that the temperature has changed, control passes to 1606 where the keep alive interval is shortened and then to 1608 where the child node waits for this shortened keep alive interval to expire. In 1610, the child node transmits a keep alive packet to the parent node on the next time slot using the path.

In some embodiments the child node increases its keep-alive rate in response to not receiving an acknowledgement from the parent node.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system for maintaining synchronization of nodes in a wireless network comprising:
a first node comprising a transmitter, a receiver, and a first time keeper and configured for wireless communication with a second node comprising a transmitter, a receiver, and a second time keeper,
wherein:
the first node transmits a keep-alive packet to the second node upon expiration of a keep-alive interval following transmission of a previous packet from the first node to the second node, so as to maintain synchronization between the first time keeper of the first node and the second time keeper of the second node,
the first node adjusts the keep-alive interval between transmissions of keep-alive packets based on a determination that no acknowledgment of receipt of a previous keep-alive packet is received from the second node, and
the first node adjusts the keep-alive interval by reducing the interval between transmissions of keep-alive packets upon determining that no acknowledgment of receipt of the previous keep-alive packet is received from the second node.

2. The system of claim 1, wherein the first node transmits the keep-alive packet to the second node upon expiration of the keep-alive interval following transmission of a previous keep-alive packet from the first node to the second node.

3. The system of claim 1, wherein the first node transmits the keep-alive packet to the second node on a periodic basis based on the keep-alive interval.

4. The system of claim 1, wherein the first node transmits the keep-alive packet to the second node during a next transmission opportunity for transmitting packets from the first node to the second node after expiration of the keep-alive interval following transmission of the previous keep-alive packet to the second node.

5. The system of claim 1, wherein the first node shortens the keep-alive interval between transmissions of keep-alive packets in response to detecting an increase in a timing error value between the first time keeper and the second time keeper, and lengthens the keep-alive interval between transmissions of keep-alive packets in response to detecting a decrease in the timing error value.

6. The system of claim 1, wherein the first node receives a keep-alive response from the second node responsive to the transmitting of the keep-alive packet, and determines a timing error value between the first time keeper and the second time keeper based on the keep-alive response received from the second node.

7. The system of claim 1, wherein the first node shortens the keep-alive interval between transmissions of keep-alive packets in response to detecting a change in temperature at the first node.

8. The system of claim 1, wherein the second node further comprises a timing error measurer for measuring a timing error value between the first time keeper and the second time keeper based on a difference between an expected time of reception at the second node of a packet transmitted from the first node and an actual time of reception of the packet at the second node.

9. The system of claim 8, wherein the first node receives the measured timing error value in a response message received from the second node, and adjusts the keep-alive interval between transmissions of keep-alive packets based on the received timing error value.

10. The system of claim 1, wherein:
the first node is configured for wireless communication with a third node comprising a transmitter, a receiver, and a third time keeper, and
the first node adjusts the keep-alive interval in response to a change in a timing error value between the first time keeper and the third time keeper.

11. A method for maintaining synchronization of nodes in a wireless network comprising:
transmitting a plurality of keep-alive packets from a first node of the wireless network to a second node of the wireless network so as to maintain synchronization between a first time keeper of the first node and a second time keeper of the second node,
wherein each keep-alive packet is transmitted from the first node to the second node upon expiration of a keep-alive interval following transmission of a previous packet from the first node to the second node; and
adjusting the keep-alive interval between transmissions of the keep-alive packets based on a determination that no acknowledgment of receipt of a previous keep-alive packet is received from the second node,
wherein the adjusting the keep-alive interval comprises reducing the interval between transmissions of keep-alive packets upon determining that no acknowledgment of receipt of the previous keep-alive packet is received from the second node.

12. The method of claim 11, wherein each keep-alive packet is transmitted from the first node to the second node upon expiration of the keep-alive interval following transmission of a previous keep-alive packet from the first node to the second node.

13. The method of claim 11, wherein the first node transmits the keep-alive packets to the second node on a periodic basis based on the keep-alive interval.

14. The method of claim 11, wherein the first node transmits each keep-alive packet to the second node during a next transmission opportunity for transmitting packets from the first node to the second node after expiration of the keep-alive interval following transmission of the previous keep-alive packet to the second node.

15. The method of claim 11, wherein the first node shortens the keep-alive interval between transmissions of keep-alive packets in response to detecting an increase in a timing error value between the first time keeper and the second time keeper, and lengthens the keep-alive interval between transmissions of keep-alive packets in response to detecting a decrease in the timing error value.

16. The method of claim 11, further comprising:
receiving in the first node a keep-alive response from the second node responsive to the transmitting of a keep-alive packet; and
determining a timing error value between the first time keeper and the second time keeper based on the keep-alive response received from the second node.

17. The method of claim 11, wherein the first node shortens the keep-alive interval between transmissions of keep-alive packets in response to detecting a change in temperature at the first node.

18. The method of claim 16, further comprising:
receiving in the first node a response message including a second timing error value measured in the second node, the second timing error value being based on a difference between an expected time of reception at the second node of a packet transmitted from the first node and an actual time of reception of the packet at the second node; and
adjusting the keep-alive interval between transmissions of keep-alive packets based on the received timing error value.

19. The method of claim 11, further comprising:
adjusting the keep-alive interval between transmissions of the keep-alive packets based on a change in a timing error value between the first time keeper of the first node and a third time keeper of a third node of the wireless network.

20. A timer compensator system comprising:
an oscillator outputting an oscillator signal having a predetermined frequency;
a summing junction having a first input receiving a feedback signal based on a summing signal output by the summing junction, a second input receiving an input set-point signal, and an output producing the summing signal based on a sum of the feedback signal and the input set-point signal;
an accumulator receiving the summing signal from the summing junction at an input, and producing an accumulation signal based on the summing signal;
a comparator receiving the accumulation signal from the accumulator at an input, and producing a comparison signal based on the accumulation signal; and
a first counter receiving the oscillator signal from the oscillator, receiving the comparison signal from the comparator, and producing a first count signal based on the oscillator signal and the comparison signal.

21. The system of claim 20, wherein the feedback signal received at the first input of the summing junction is based on the comparison signal output produced by the comparator, and wherein the accumulator, the comparator, and the summing junction comprise a first-order delta-sigma modulator.

* * * * *